United States Patent
Choi et al.

(10) Patent No.: US 11,737,091 B2
(45) Date of Patent: Aug. 22, 2023

(54) METHOD, DEVICE, AND SYSTEM FOR DOWNLINK DATA RECEPTION AND HARQ-ACK TRANSMISSION IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/871,886

(22) Filed: Jul. 22, 2022

(65) Prior Publication Data
US 2022/0377777 A1    Nov. 24, 2022

Related U.S. Application Data

(63) Continuation of application No. 17/516,700, filed on Nov. 2, 2021, now Pat. No. 11,490,406, which is a
(Continued)

(30) Foreign Application Priority Data

May 2, 2019  (KR) .................. 10-2019-0051423
Nov. 7, 2019 (KR) .................. 10-2019-0142105
(Continued)

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 24/08* (2013.01); *H04W 72/21* (2023.01)

(58) Field of Classification Search
CPC ......... H04W 72/1273; H04W 72/1284; H04W 24/08; H04L 1/1812; H04L 5/0053
(Continued)

(56) References Cited

U.S. PATENT DOCUMENTS 10,980,049 B2    4/2021 Yang et al.
11,018,946 B1    5/2021 Babaei
(Continued)

FOREIGN PATENT DOCUMENTS

CN    106063177    10/2016
EP    3 364 582    8/2018
(Continued)

OTHER PUBLICATIONS

Office Action dated Jul. 8, 2022 for Korean Patent Application No. 10-2021-7038863 and its English translation provided by Applicant's foreign counsel.
(Continued)

*Primary Examiner* — Chi Tang P Cheng
(74) *Attorney, Agent, or Firm* — Ladas & Parry, LLP

(57) ABSTRACT

The present invention relates to a method, device, and system for downlink data reception and HARQ-ACK transmission in a wireless communication system. According to the present invention, in the method, device, and system for downlink data reception and HARQ-ACK transmission, a first physical downlink control channel (PDCCH) for scheduling of a first physical downlink shared channel (PDSCH) is received, and a second PDCCH for scheduling of a second PDSCH is received. Thereafter, uplink control information (UCI) including a hybrid automatic repeat request (HARQ)-
(Continued)

acknowledge (ACK) codebook for the first PDSCH and the second PDSCH is transmitted to a base station.

16 Claims, 24 Drawing Sheets

Related U.S. Application Data continuation of application No. PCT/KR2020/005923, filed on May 4, 2020.

(30) Foreign Application Priority Data

Feb. 11, 2020 (KR) .......................... 10-2020-0016625
Apr. 9, 2020 (KR) .......................... 10-2020-0043301

(51) Int. Cl.
*H04L 5/00* (2006.01)
*H04W 24/08* (2009.01)
*H04W 72/21* (2023.01)

(58) Field of Classification Search
USPC .......................................................... 370/329
See application file for complete search history.

(56) References Cited

U.S. PATENT DOCUMENTS

| | | | |
|---|---|---|---|
| 2010/0165939 A1 | 7/2010 | Lin | |
| 2013/0343313 A1* | 12/2013 | Takeda ................ | H04L 27/2602 370/329 |
| 2017/0134140 A1* | 5/2017 | Park ..................... | H04L 1/1887 |
| 2018/0014284 A1 | 1/2018 | Yi et al. | |
| 2018/0310257 A1 | 10/2018 | Papasakellariou | |
| 2020/0245335 A1 | 7/2020 | Joseph et al. | |
| 2020/0336239 A1* | 10/2020 | Khoshnevisan .... | H04W 72/042 |
| 2020/0413424 A1 | 12/2020 | Fakooria et al. | |
| 2021/0051634 A1 | 2/2021 | Fakoorian et al. | |
| 2021/0112578 A1 | 4/2021 | Yang et al. | |
| 2021/0144686 A1 | 5/2021 | Fakoorian et al. | |
| 2021/0144688 A1 | 5/2021 | Lin et al. | |
| 2022/0061077 A1 | 2/2022 | Choi et al. | |

FOREIGN PATENT DOCUMENTS

| | | |
|---|---|---|
| WO | 2017/043916 | 3/2017 |
| WO | 2017/192793 | 11/2017 |
| WO | 2018/128474 | 7/2018 |
| WO | 2020/214376 | 10/2020 |
| WO | 2020/214950 | 10/2020 |
| WO | 2020/222624 | 11/2020 |
| WO | 2021/034063 | 2/2021 |
| WO | 2021/040681 | 3/2021 |
| WO | 2021/065864 | 4/2021 |
| WO | 2021/066013 | 4/2021 |
| WO | 2021/066117 | 4/2021 |
| WO | 2021/072610 | 4/2021 |
| WO | 2021/090734 | 5/2021 |

OTHER PUBLICATIONS

Extended European Search Report dated Jul. 22, 2022 for European Patent Application No. 20798932.8.
Wilus Inc.: "Remaining Issues on UCI enhancement for NR URLLC", 3GPP TSG RAN WG1 #99, R1-1913068, Reno, USA, Nov. 18-22, 2019, pp. 1-8.
Office Action dated Jul. 27, 2022 for Indian Patent Application No. 202227012623.
International Preliminary Report on Patentability (Chapter I) for PCT/KR2020/005923 dated Nov. 2, 2021 and its English translation from WIPO.
International Preliminary Report on Patentability (Chapter I) for PCT/KR2020/010931 dated Feb. 17, 2022 and its English translation from WIPO.
International Search Report for PCT/KR2020/005923 dated Aug. 27, 2020 and its English translation from WIPO (now published as WO 2020/222624).
Written Opinion of the International Searching Authority for PCT/KR2020/005923 dated Aug. 27, 2020 (now published as WO 2020/222624) and its English translation by Google Translate.
SAMSUNG. Specification update on HARQ-ACK Codebooks Incorporating Proposals in RAN1#94. R1-1809706. 3GPP TSG RAN WG1 #94. Gothenburg, Sweden. Aug. 21, 2018.
Nokia et al. On remaining details of HARQ procedure. R1-1720480. 3GPP TSG RAN WG1 Meeting #91, Reno, USA, Nov. 17, 2017.
Nokia et al. Remaining aspects of NR CA. R1-1802540. 3GPP TSG RAN WG1 Meeting #92, Athens, Greece. Feb. 16, 2018.
Nokia et al. On remaining aspects of NR CA/DC. R1-1720512. 3GPP TSG-RAN WG1 Meeting NR#91. Reno, USA, Nov. 17 2017.
International Search Report for PCT/KR2020/010931 dated Dec. 3, 2020 and its English translation from WIPO (now published as WO 2021/034063).
Written Opinion of the International Searching Authority for PCT/KR2020/010931 dated Dec. 3, 2020 (now published as WO 2021/034063) and its English translation from WIPO.
Nokia, Nokia Shanghai Bell: "On Enhances UL Configured Grant Transmission for NR URLLC and activation/release of multiple SPS configurations", 3GPP TSG RAN WG1 Meeting #98, R1-1908971, Prague, CZ, Aug. 26-30, 2019, pp. 1-7.
Nokia, Nokia Shanghai Bell: "On Configured Grant enhancements for NR URLLC", 3GPP TSG RAN WG1 Ad-Hoc Meeting 1901, R1-1900932, Taipei, Taiwan, Jan. 21-25, 2019, pp. 1-12.
3GPP TS 38.213 V15.6.0: "$3^{rd}$ Generation Partnership Project; Technical Specification Group Radio Access Network; NR; Physical layer procedures for control (Release 15)", France, Jun. 24, 2019, pp. 1-107.
Nokia, Nokia Shanghai Bell: "On resource conflicts between UL grants and HARQ-ACK Enhancements for SPS", 3GPP TSG RAN WG1 Meeting #98, R1-1908439, Prague, CZ, Aug. 26-30, 2019, pp. 1-9.
Notice of Allowance dated May 16, 2022 for U.S. Appl. No. 17/516,700 (now published as U.S. 2022/0061077).
Office Action dated Feb. 3, 2022 for U.S. Appl. No. 17/516,700 (now published as U.S. 2022/0061077).
Office Action dated Sep. 20, 2022 for Japanese Patent Application No. 2021-565145 and its English translation provided by Applicant's foreign counsel.
Notice of Allowance dated Nov. 21, 2022 for Korean Patent Application No. 10-2021-7038863 and its English translation provided by Applicant's foreign counsel.
Office Action dated Dec. 5, 2022 for U.S. Appl. No. 17/871,881.
Office Action dated Nov. 23, 2022 for Chinese Patent Application No. 202080042075.X and its English translation provided by Applicant's foreign counsel.
Notice of Allowance dated Jan. 12, 2023 for Korean Patent Application No. 10-2021-7038863 and its English translation provided by Applicant's foreign counsel.
Notice of Allowance dated Mar. 20, 2023 for Japanese Patent Application No. 2021-565145 and its English translation provided by Applicant's foreign counsel.
Nokia, Nokia Shanghai Bell: "On UCI multiplexing", 3GPP TSG RAN WG1 Meeting #93, R1-1806927, Busan, Korea, May 21-25, 2018, pp. 1-7.
Notice of Allowance dated Apr. 26, 2023 for Chinese Patent Application No. 202080042075.X and its English translation provided by Applicant's foreign counsel.

\* cited by examiner

FIG.13
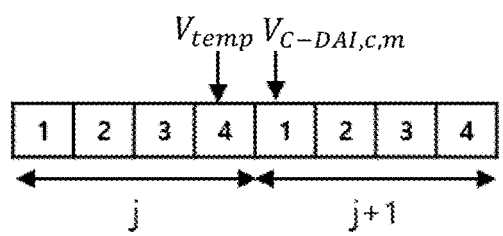
(a)
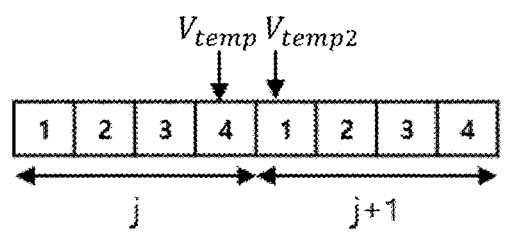
(b)

FIG.15

Alt 1

| DCI format 1_2 (binary=1,C-DAI=2) |
|---|
| DCI format 1_1 (binary=x1,C-DAI=2) |
| DCI format 1_1 (binary=0,C-DAI=1) |
| DCI format 1_1 (binary=x1,C-DAI=2) |
| DCI format 1_2 (binary=0,C-DAI=1) |
| DCI format 1_2 (binary=1,C-DAI=2) |
| DCI format 1_1 (binary=x0,C-DAI=1) |

↑ Cell index (a)

Alt 2

| DCI format 1_2 (0) (binary=0,C-DAI=1 or 3) |
|---|
| DCI format 1_1 (01) (binary=01,C-DAI=2) |
| DCI format 1_2 (0) (binary=0,C-DAI=2 or 4) |
| DCI format 1_1 (11) (binary=11,C-DAI=4) |
| DCI format 1_2 (0) (binary=0,C-DAI=1 or 3) |
| DCI format 1_2 (1) (binary=1,C-DAI=2 or 4) |
| DCI format 1_1 (binary=00,C-DAI=1) |

↑ Cell index (b)

FIG. 17

| MO#0 | MO#1 | MO#2 | MO#3 | MO#4 | MO#5 | MO#6 | DCI format for PUSCH |
|---|---|---|---|---|---|---|---|
| C-DAI=1 | C-DAI=2 | C-DAI=1 | C-DAI=2 | C-DAI=1 | C-DAI=2 | C-DAI=1 | UL-DAI = 3 |

(a)

| MO#0 | MO#1 | MO#2 | MO#3 | MO#4 | MO#5 | MO#6 | DCI format for PUSCH |
|---|---|---|---|---|---|---|---|
| C-DAI=1 | C-DAI=2 | C-DAI=1 | C-DAI=2 | ~~C-DAI=1~~ | ~~C-DAI=2~~ | C-DAI=1 | UL-DAI = 3 |

(b)

FIG.18
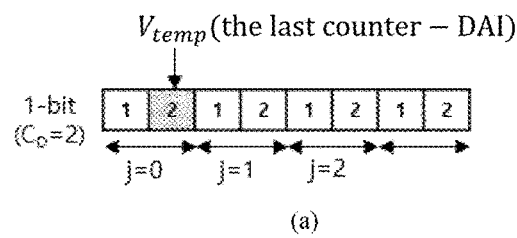
(a)
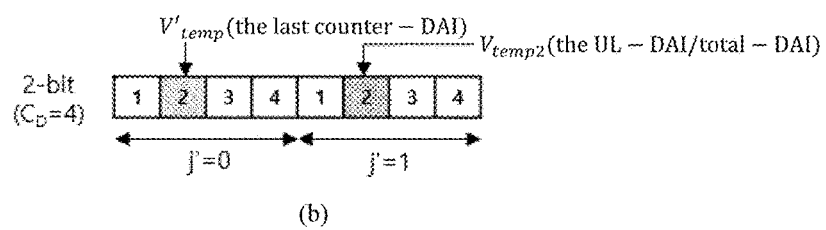
(b)

| MO#0 | MO#1 | MO#2 | MO#3 | MO#4 | MO#5 | MO#6 |
|---|---|---|---|---|---|---|
| C-DAI=1 T-DAI=1 | C-DAI=2 T-DAI=2 | C-DAI=1 T-DAI=3 | C-DAI=2 T-DAI=4 | C-DAI=1 T-DAI=1 | C-DAI=2 T-DAI=2 | C-DAI=1 T-DAI=3 |

(b)

| MO#0 | MO#1 | MO#2 | MO#3 | MO#4 | MO#5 | MO#6 |
|---|---|---|---|---|---|---|
| C-DAI=1 T-DAI=1 | C-DAI=2 T-DAI=2 | C-DAI=1 T-DAI=3 | C-DAI=2 T-DAI=4 | ~~C-DAI=1 T-DAI=1~~ | ~~C-DAI=2 T-DAI=2~~ | C-DAI=1 T-DAI=3 |

METHOD, DEVICE, AND SYSTEM FOR DOWNLINK DATA RECEPTION AND HARQ-ACK TRANSMISSION IN WIRELESS COMMUNICATION SYSTEM

CROSS-REFERENCE TO RELATED APPLICATIONS

This application is a continuation of U.S. patent application Ser. No. 17/516,700 filed on Nov. 2, 2021, which is a continuation of International Patent Application No. PCT/KR2020/005923, filed on May 4, 2020, which claims the priority to Korean Patent Application No. 10-2019-0051423 filed in the Korean Intellectual Office on May 2, 2019, Korean Patent Application No. 10-2019-0142105 filed in the Korean Intellectual Office on Nov. 7, 2019, Korean Patent Application No. 10-2020-0016625 filed in the Korean Intellectual Office on Feb. 11, 2020, and Korean Patent Application No. 10-2020-0043301 filed in the Korean Intellectual Office on Apr. 9, 2020, the entire contents of which are incorporated herein by reference.

TECHNICAL FIELD

The present disclosure relates to a wireless communication system, and more particularly, the present disclosure relates to transmission of downlink data and transmission of an acknowledgment thereto in a wireless communication system.

BACKGROUND ART

3GPP LTE(-A) defines uplink/downlink physical channels to transmit physical layer signals. For example, a physical uplink shared channel (PUSCH) that is a physical channel for transmitting data through an uplink, a physical uplink control channel (PUCCH) for transmitting a control signal, a physical random access channel (PRACH), and the like are defined, and there are a physical downlink shared channel (PDSCH) for transmitting data to a downlink as well as a physical control format indicator channel (PCFICH) for transmitting L1/L2 control signals, a physical downlink control channel (PDCCH), a physical hybrid ARQ indicator channel (PHICH), and the like.

The downlink control channels (PDCCH/EPDCCH) among the above channels are channels for a base station to transmit uplink/downlink scheduling allocation control information, uplink transmit power control information, and other control information to one or more user equipments. Since resources available for PDCCH that can be transmitted by a base station at one time are limited, different resources cannot be allocated to each user equipment, and control information should be transmitted to an arbitrary user equipment by sharing resources. For example, in 3GPP LTE(-A), four resource elements (REs) may be grouped to form a resource element group (REG), nine control channel elements (CCEs) may be generated, resources capable of combining and sending one or more CCEs may be notified to a user equipment, and multiple user equipments may share and use CCEs. Here, the number of combined CCEs is referred to as a CCE combination level, and a resource to which CCE is allocated according to a possible CCE combination level is referred to as a search space. The search space may include a common search space defined for each base station and a terminal-specific or UE-specific search space defined for each user equipment. A user equipment performs decoding for the number of cases of all possible CCE combinations in the search space, and may recognize whether the user equipment belongs to a PDCCH through a user equipment (UE) identifier included in the PDCCH. Therefore, such an operation of a user equipment requires a long time for decoding a PDCCH and unavoidably causes a large amount of energy consumption.

Efforts are being made to develop an improved 5G communication system or pre-5G communication system to satisfy wireless data traffic demand that is increasing after the commercialization of a 4G communication system. For this reason, a 5G communication system or pre-5G communication system is referred to as a beyond 4G network communication system or post-LTE system. It is considered to implement a 5G communication system in an ultrahigh frequency (mmWave) band (e.g., 60-GHz band) to achieve a high data transfer rate. To reduce a radio propagation path loss and increase a transfer distance of radio waves in an ultrahigh frequency band, beamforming, massive MIMO, full dimensional MIMO (FD-MIMO), array antenna, analog beamforming, and large scale antenna technologies are discussed in the field of a 5G communication system. Furthermore, to improve a network of a system, technologies such as advanced small cell, cloud radio access network (cloud RAN), ultra-dense network, device-to-device communication (D2D), wireless backhaul, moving network, cooperative communication, Coordinated Multi-Points (CoMP), interference cancellation, and the like are developed in the field of a 5G communication system. In addition, hybrid FSK and QAM modulation (FQAM) and sliding window superposition coding (SWSC), which are advanced coding modulation (ACM) schemes, and filter bank multi carrier (FBMC), nonorthogonal multiple access (NOMA), and sparse code multiple access (SCMA), which are advanced access technologies, are developed in the field of a 5G system.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Here, various attempts are made to apply a 5G communication system to an IoT network. For example, technologies such as sensor network, machine to machine (M2M), and machine type communication (MTC) are implemented with 5G communication technologies, i.e., beamforming, MIMO, array antenna, and the like. Applying a cloud radio access network (cloud RAN) as the above-described big data processing technology may be an example of convergence of 5G technology and IoT technology.

In general, a mobile communication system has been developed to provide a voice service while securing activity of a user. However, the area of a mobile communication system is expanding to not only a voice service but also a data service, and has been so developed as to provide a high-speed data service at the present time. However, in a mobile communication system which is currently being used to provide a service, a resource shortage phenomenon occurs and users require higher-speed services. Thus, a more developed wireless communication system is required.

As described above, a future 5G technology requires lower latency of data transmission with the advent of new applications such as real-time control and tactile Internet, and a required latency of 5G data is expected to be decreased to 1 ms. 5G has an objective of providing a data latency that is reduced by about 10 times compared to the prior art. To resolve such problems, a 5G communication system is expected to be proposed, which uses a mini-slot having a shorter TTI interval (e.g., 0.2 ms) in addition to an existing slot (or subframe).

In the Rel-16 enhanced URLLC (eURLLC), various technologies for providing a lower latency time and higher reliability are discussed. To provide a lower latency time, transmission of an uplink control channel including two or more HARQ-ACKs in a single slot is supported. A user equipment is enabled to transmit HARQ-ACK as quickly as possible as a response for success of reception of a downlink shared channel, thereby securing a lower latency time.

DISCLOSURE OF THE INVENTION

Technical Problem

The present disclosure relates to a method for designing a semi-static HARQ-ACK codebook in a 3GPP NR system and a method for transmitting a PUCCH, and an object therefore is to provide a method and a device therefor capable of solving a problem occurring in a situation in which PDSCHs and PUCCHs are repeatedly transmitted in a plurality of slots.

It will be appreciated by persons skilled in the art that the objects that can be achieved by the present disclosure are not limited to what has been particularly described hereinabove and the above and other objects that the present disclosure can achieve will be more clearly understood from the following detailed description taken in conjunction with the accompanying drawings.

Technical Solution

A user equipment of a wireless communication system according to an embodiment of the present disclosure includes a communication module and a processor that controls the communication module. The processor receives a first physical downlink control channel (PDCCH) for scheduling of a first physical downlink shared channel (PDSCH), the first PDCCH including a first counter downlink assignment indicator (DAI) indicating the number of PDSCHs scheduled up to a serving cell at a time point at which the first PDCCH is monitored and a first total DAI indicating the number of all PDSCHs scheduled in the serving cell until a time point at which a PDCCH is monitored, receives a second PDCCH for scheduling of a second PDSCH, the second PDCCH including a second counter DAI and a second total DAI, receives the first PDSCH based on the first PDCCH, receives the second PDSCH based on the second PDCCH, and transmits, to the base station, uplink control information (UCI) including a hybrid automatic repeat request (HARQ)-acknowledge (ACK) codebook for the first PDSCH and the second PDSCH, a value of the second counter DAI being determined based on the number of bits of the first counter DAI when the number of bits of the first counter DAI is different from the number of bits of the second counter DAI.

In addition, in the present disclosure, when the number of the bits of the first counter DAI is smaller than the number of the bits of the second counter DAI, a value indicated by the second counter DAI is determined based on at least one of bits with a number equal to the number of bits of the first counter DAI among bits of the second counter DAI.

In addition, in the present disclosure, when there are a plurality of values determined by at least one of the bits of the second counter DAI with the number equal to the number of bits of the first counter DAI, a determination is made that the value of the second counter DAI is a value with the smallest difference from the value indicated by the first counter DAI among the plurality of values.

In addition, in the present disclosure, when the first counter DAI is 1 bit and the second counter DAI is 2 bits, the value of the second counter DAI is determined using a least significant bit (LSB) or a most significant bit (MSB) of the 2 bits.

In addition, in the present disclosure, when the 1 bit of the first counter DAI is '0', the value of the second counter DAI is determined as '2' when the LSB or the MSB of the second counter DAI is '0', and the value of the second counter DAI is determined as '1' when the LSB or the MSB of the second counter DAI is '1'.

In addition, in the present disclosure, when the 1 bit of the first counter DAI is '1', the value of the second counter DAI is determined as '1' when the LSB or MSB of the second counter DAI is '1', and the value of the second counter DAI is determined as '2' when the LSB or MSB of the second counter DAI is '0'.

In addition, in the present disclosure, when the number of bits of the first counter DAI is greater than the number of bits of the second counter DAI, the value indicated by the second counter DAI is determined by extending the number of bits of the second counter DAI to the same number of bits as the number of bits of the first counter DAI.

In addition, in the present disclosure, when there are a plurality of second counter DAI values determined by being extended to the same number of bits as the number of bits of the first counter DAI, a determination is made that the value of the second counter DAI is a value with the smallest difference from the value indicated by the first counter DAI among the plurality of values.

In addition, in the present disclosure, when the first counter DAI is 2 bits and the second counter DAI is 1 bit, the value of the second counter DAI is determined by extending 1 bit to 2 bits.

In addition, in the present disclosure, when the 2 bits of the first counter DAI are '00' or '01' and the 1 bit of the second counter DAI is '0', the second counter DAI is determined as '3', and when the 2 bits of the first counter DAI are '10' or '11' and the 1 bit of the second counter DAI is '1', the second counter DAI is determined as '1'.

In addition, in the present disclosure, when the 2 bits of the first counter DAI are '01' or '10' and the 1 bit of the second counter DAI is '1', the second counter DAI is determined as '4', and when the 2 bits of the first counter DAI are '00' or '11' and the 1 bit of the second counter DAI is '1', the second counter DAI is determined as '2'.

In addition, the present disclosure provides a method including: receiving a first physical downlink control channel (PDCCH) for scheduling of a first physical downlink shared channel (PDSCH), the first PDCCH including a first counter downlink assignment indicator (DAI) indicating the number of PDSCHs scheduled up to a serving cell at a time point at which the first PDCCH is monitored and a first total DAI indicating the number of all PDSCHs scheduled in the serving cell until a time point at which a PDCCH is monitored; receiving a second PDCCH for scheduling of a second PDSCH, the second PDCCH including a second counter DAI and a second total DAI; receiving the first PDSCH based on the first PDCCH; receiving the second PDSCH based on the second PDCCH; and transmitting, to the base station, uplink control information (UCI) including a hybrid automatic repeat request (HARQ)-acknowledge (ACK) codebook for the first PDSCH and the second PDSCH, in which a value of the second counter DAI is determined based on the number of bits of the first counter DAI when the number of bits of the first counter DAI is different from the number of bits of the second counter DAI.

Advantageous Effects

According to embodiments of the present disclosure, the UE may transmit a PUCCH including two or more HARQ-ACKs in one slot. In this case, the coverage of the PUCCH may be increased by reducing the amount of HARQ-ACK that may be possessed by each PUCCH.

Further, according to embodiments of the present disclosure, there is an effect that HARQ-ACK information on the PDSCH scheduled by downlink control information having a different format may be multiplexed and transmitted.

In addition, according to embodiments of the present disclosure, HARQ-ACK information on the PDSCH scheduled by different downlink control information is multiplexed and transmitted, and thus an effect of reducing the signaling overhead for transmission of HARQ-Ack information is produced.

In addition, according to embodiments of the present disclosure, an HARQ-ACK bit(s) sequence having a small overhead of downlink control information (e.g., DCI) may be determined, and thus an effect of increasing transmission efficiency of the network between the base station and the UE is produced.

The effects obtainable from the present disclosure are not limited to the effects mentioned above, and other effects not mentioned may be clearly understood by those skilled in the art from the following description.

BRIEF DESCRIPTION OF THE DRAWINGS

FIG. 13 illustrates an example of a method for counting the number of PDSCHs transmitted from a base station by a user equipment based on a pseudo code that is applicable to an embodiment of the present disclosure.

FIG. 15 illustrates another example of a method for transmitting a HARQ-Ack based on downlink control information having a different format according to an embodiment of the present disclosure.

FIG. 17 illustrates an example of a downlink assignment indicator of each piece of downlink control information detected in a monitoring occasion according to an embodiment of the present disclosure.

FIG. 18 illustrates an example of a method for transmitting a HARQ-ACK based on downlink control information having a different format based on a pseudo code according to an embodiment of the present disclosure.

FIG. 19 illustrates an example of a downlink assignment indicator of each piece of downlink control information detected in a monitoring occasion according to an embodiment of the present disclosure.

MODE FOR CARRYING OUT THE INVENTION

Figure 1:
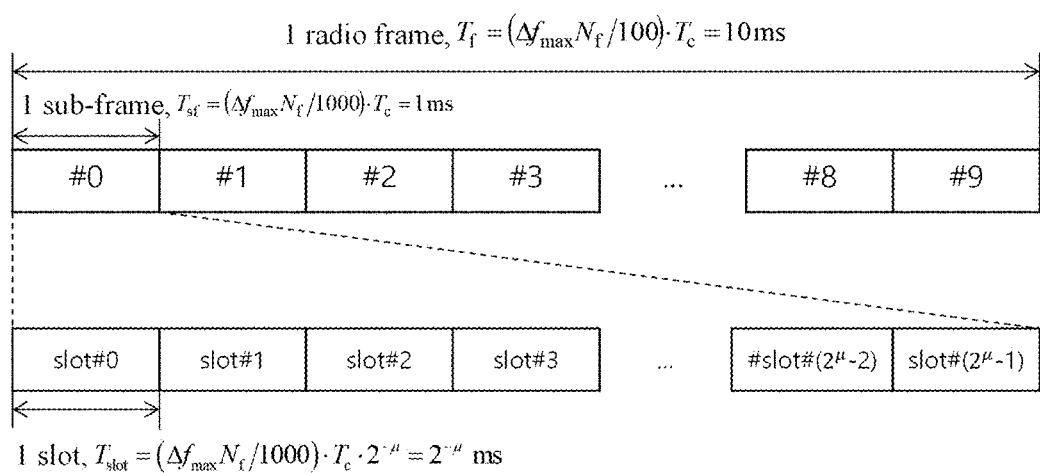
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

Although details of the description are separately categorized into embodiments below to assist with an understanding, the embodiments may be used in combination. In the present disclosure, a configuration of a user equipment may represent a configuration by a base station. In detail, a base station may transmit a signal to a user equipment to set a parameter value used in operation of the user equipment or a wireless communication system.

FIG. 1 illustrates an example of a wireless frame structure used in a wireless communication system. Referring to FIG. 1, the wireless frame (or radio frame) used in the 3GPP NR system may have a length of 10 ms ($\Delta f_{max} N_f/100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and can have a value of =0-4 as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to $2^\mu-1$ may be respectively allocated to 2 slots within one subframe. In addition, numbers from 0 to $10*2^\mu-1$ may be respectively allocated to slots within one wireless frame. The time resource may be distinguished by at least one of a wireless frame number (also referred to as a wireless frame index), a subframe number (also referred to as a subframe index), and a slot number (or a slot index).

Figure 2:
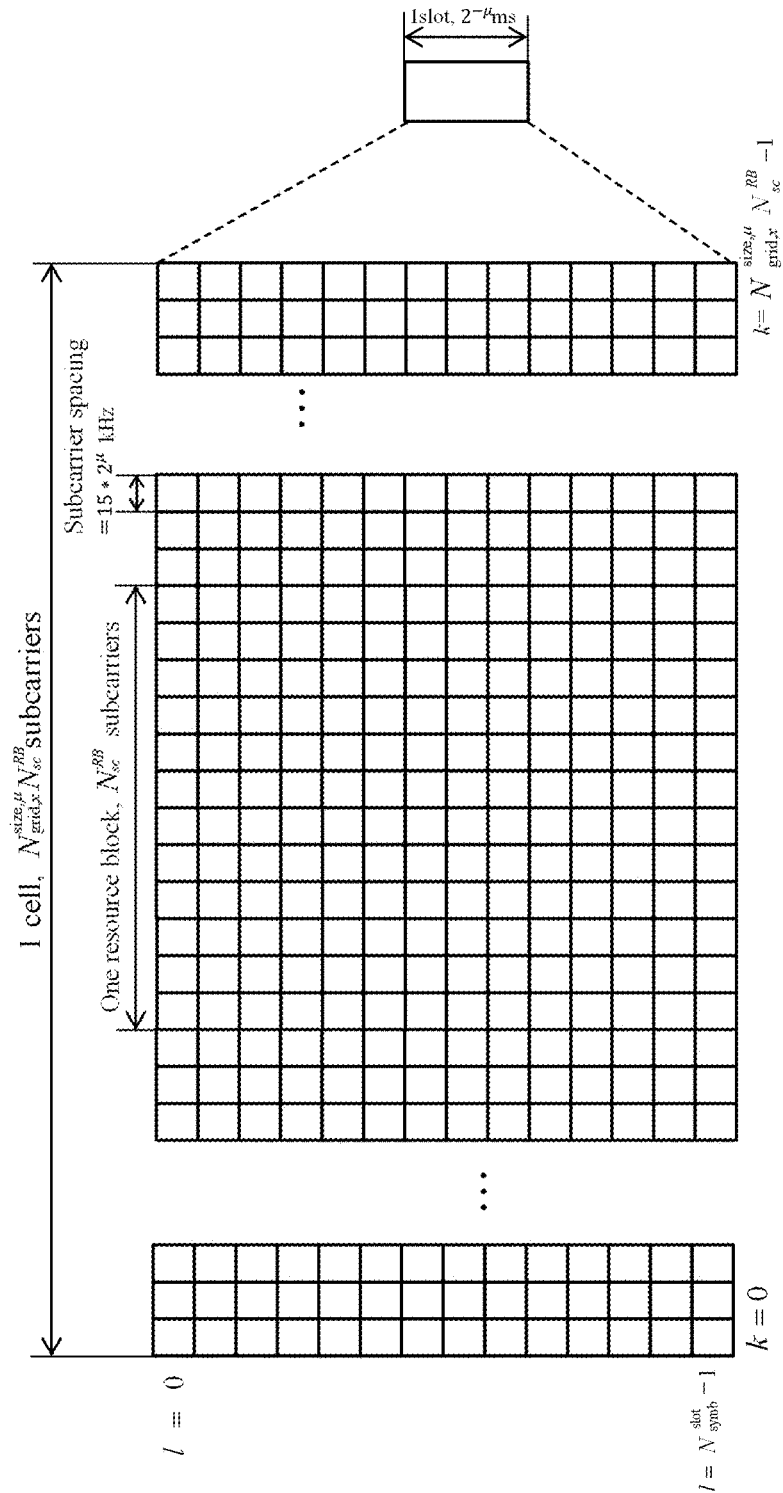
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 successive subcarriers in a frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ(x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grind,x} * N^{RB}_{sc} - 1$ in the frequency domain, and 1 may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal cannot change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
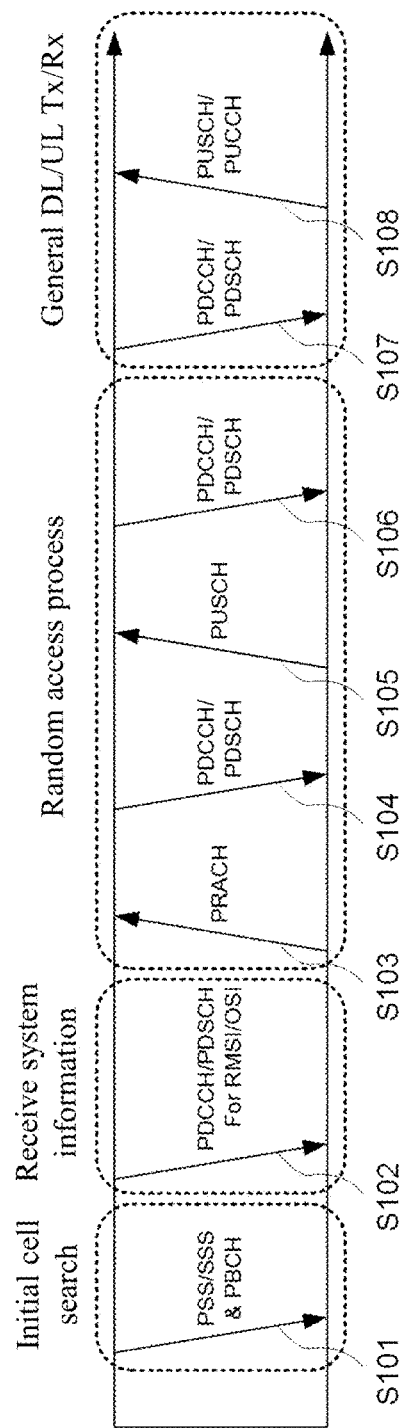
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

Here, the system information received by the user equipment is cell-common system information for the user equipment to correctly operate in a physical layer in radio resource control (RRC), and is referred to as remaining system information or system information block (SIB).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The user equipment may obtain terminal-specific system information required for the user equipment to correctly operate in a physical layer in an RRC layer during a random access process. When the user equipment obtains the terminal-specific system information from the RRC layer, the user equipment enters an RRC connected mode.

The RRC layer is used to generate and manage a message between the user equipment and a radio access network (RAN). In more detail, the base station and the user equipment may perform, in the RRC layer, broadcasting of cell system information required for all user equipments in a cell, management of transfer of a paging message, mobility management and handover, measurement report of the user equipment and a control therefor, and storage management including user equipment capability management and device management. In general, since update of a signal transferred in the RRC layer (hereinafter, RRC signal) is longer than a transmission/reception period (i.e., transmission time interval (TTI)) in a physical layer, the RRC signal may be maintained for a long period without being changed.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
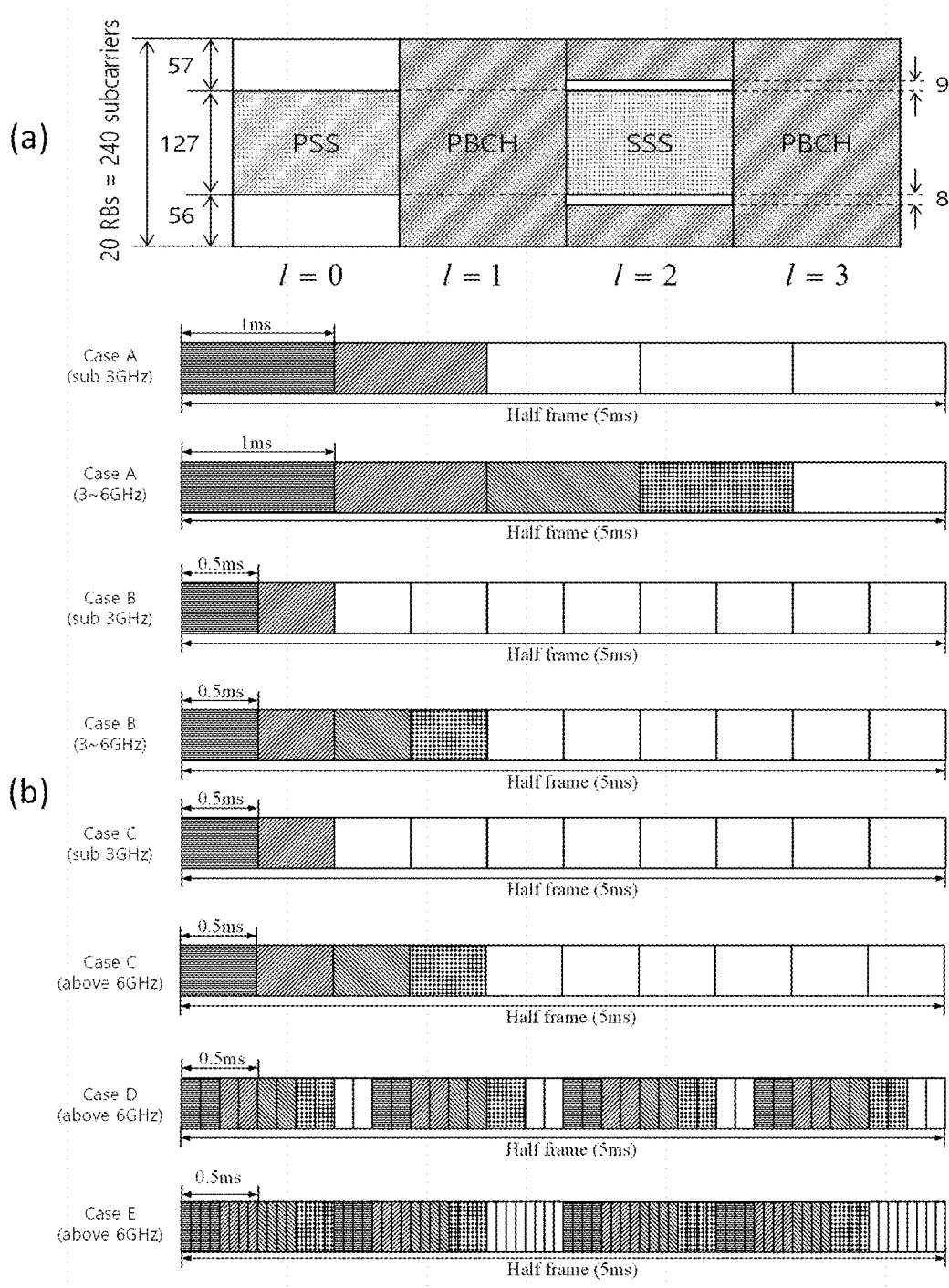
FIG. 4 illustrates an SS/PBCH block for initial cell access in a 3GPP NR system.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number 1 relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v<br>192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID})\bmod 127$$

$$0 \leq n < 127$$

Here, $x(i+7)=(x(i+4)+x(i)) \bmod 2$ and is given as
[x(6) x(5) x(4) x(3) x(2) x(1) x(0)]=[1 1 1 0 1 1 0]
Further, the sequence $d_{SSS}(n)$ of the SSS is as follows.

$$d_{SSS}(n) = [1 - 2x_0((n + m_0)\bmod 127)][1 - 2x_1((n + m_1)\bmod 127)]$$

$$m_0 = 15\left\lfloor \frac{N^{(1)}_{ID}}{112} \right\rfloor + 5N^{(2)}_{ID}$$

$$m_1 = N^{(1)}_{ID} \bmod 112$$

$$0 \leq n < 127$$

$$x_0(i+7)=(x_0(i+4)+x_0(i)) \bmod 2$$

Here, $x_1(i+7)=(x_1(i+1)+x_1(i)) \bmod 2$ and is given as
[$x_0$(6) $x_0$(5) $x_0$(4) $x_0$(3) $x_0$(2) $x_0$(1) $x_0$(0)]=[0 0 0 0 0 0 1]
[$x_1$(6) $x_1$(5) $x_1$(4) $x_1$(3) $x_1$(2) $x_1$(1) $x_1$(0)]=[0 0 0 0 0 0 1].

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
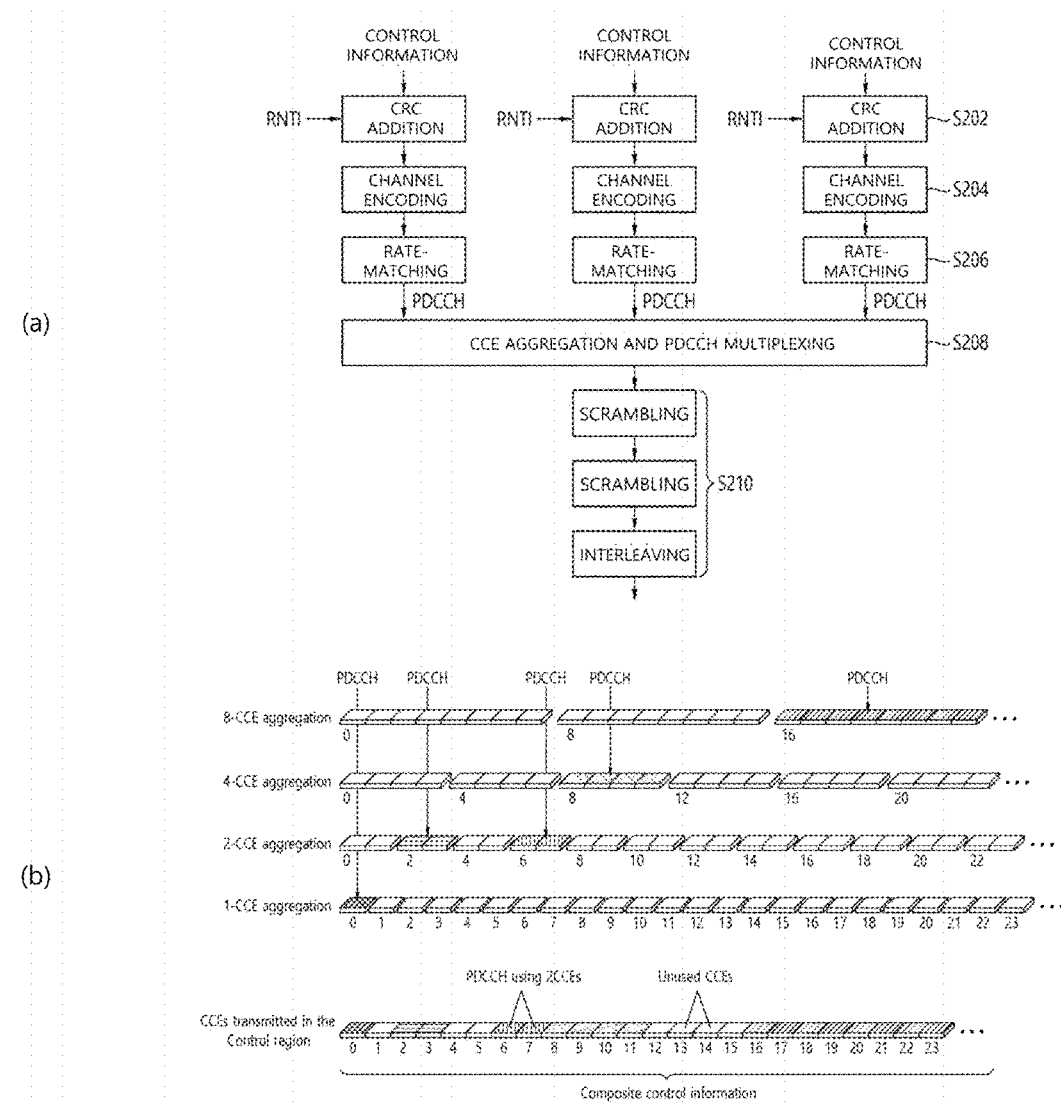
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
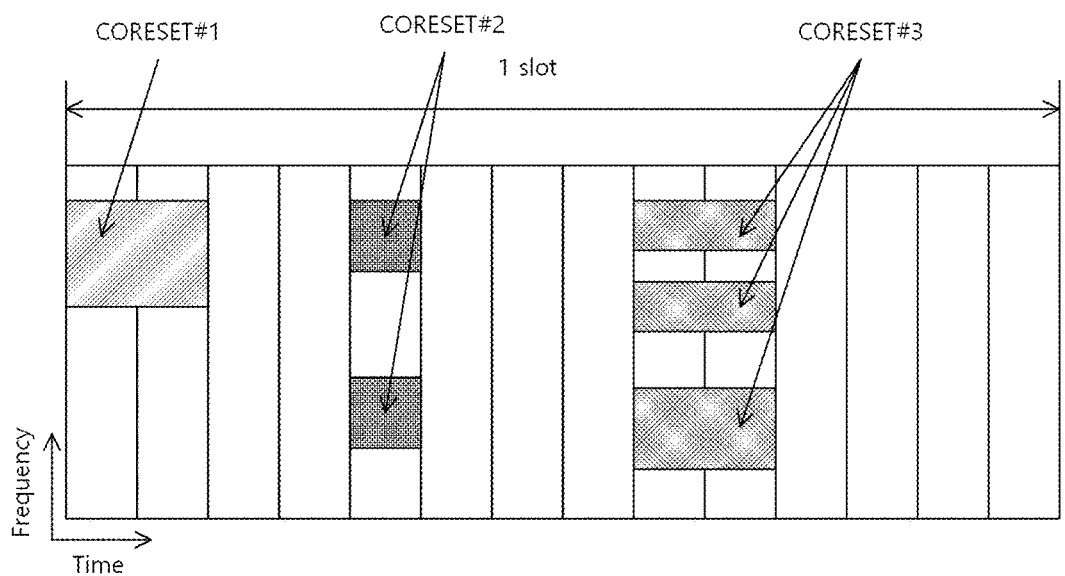
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
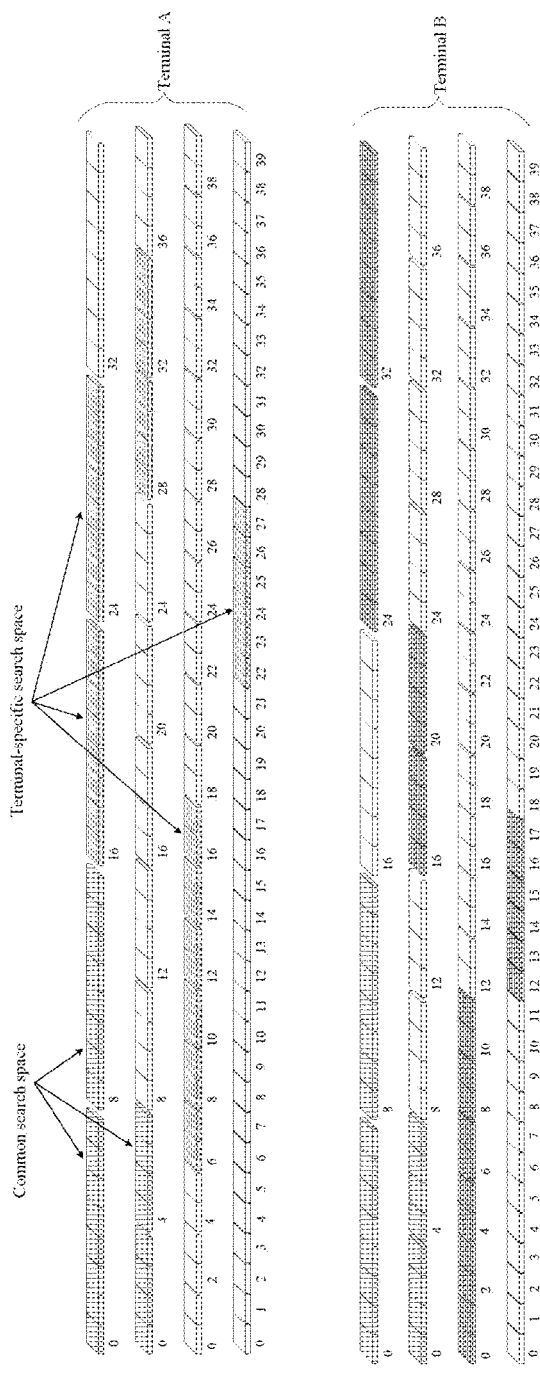
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of an uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted through a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format for transferring 1-bit or 2-bit HARQ-ACK information or SR. PUCCH format 0 may be transmitted through one or two OFDM symbols on the time axis and one PRB on the frequency axis. When PUCCH format 0 is transmitted through two OFDM symbols, the same sequence on the two symbols may be transmitted through different RB. Here, the sequence may be a sequence cyclic-shifted (CS) from a base sequence used in PUCCH format 0. In this manner, the user equipment may obtain a frequency diversity gain. In detail, the user equipment may determine a cyclic shift (CS) value $m_{cs}$ according to Mbit bit UCI ($M_{bit}$=1 or 2). Furthermore, a sequence obtained by cyclic-shifting a base sequence having a length of 12 on the basis of the determined CS value $m_{cs}$ may be mapped to one OFDM symbol and 12 REs of one RB so as to be transmitted. When the number of cyclic shifts available for the user equipment is 12 and $M_{bit}$=1, 1 bit UCI 0 and 1 may be mapped to two cyclic-shifted sequences having a cyclic shift value difference of 6. Furthermore, when Mbit=2, 2-bit UCI 00, 01, 11, and 10 may be respectively mapped to four cyclic-shifted sequences having a cyclic shift value difference of 3.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$-1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$-1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the user equipment may perform transmission/reception using a bandwidth that is smaller than or equal to the bandwidth of a carrier (or cell). To this end, the user may receive a configuration of bandwidth part (BWP) configured with a partial continuous bandwidth of the bandwidth of a carrier. The user equipment which operates according to TDD or operates in an unpaired spectrum may receive a configuration of up to four DL/UL BWP pairs in one carrier (cell). Furthermore, the user equipment may activate one DL/UL BWP pair. The user equipment which operates according to FDD or operates in a paired spectrum may receive a configuration of up to four DL BWPs in a downlink carrier (or cell) and a configuration of up to four UL BWPs in an uplink carrier (or cell). The user equipment may activate one DL BWP and UL BWP for each carrier (or cell). The user equipment may not receive or transmit on a time-frequency resource except for activated BWP. The activated BWP may be referred to as active BWP.

The base station may indicate an activated BWP among BWPs configured for the user equipment through downlink control information (DCI). A BWP indicated through DCI is activated, and other configured BWP(s) are deactivated. In a carrier (or cell) operating according to TDD, the base station may add a bandwidth part indicator (BPI) indicating a BWP to be activated to the DCI that schedules PDSCH or PUSCH in order to change a DL/UL BWP pair of the user equipment. The user equipment may receive the DCI that schedules PDSCH or PUSCH, and may identify a DL/UL BWP pair to be activated on the basis of the BPI. In the case of a downlink carrier (or cell) operating according to FDD, the base station may add a BPI indicating a BWP to be activated to the DCI that schedules PDSCH in order to change a DL BWP of the base station. In the case of an uplink carrier (or cell) operating according to FDD, the base station may add a BPI indicating a BWP to be activated to the DCI that schedules PUSCH in order to change a UL BWP of the base station.

Figure 8:
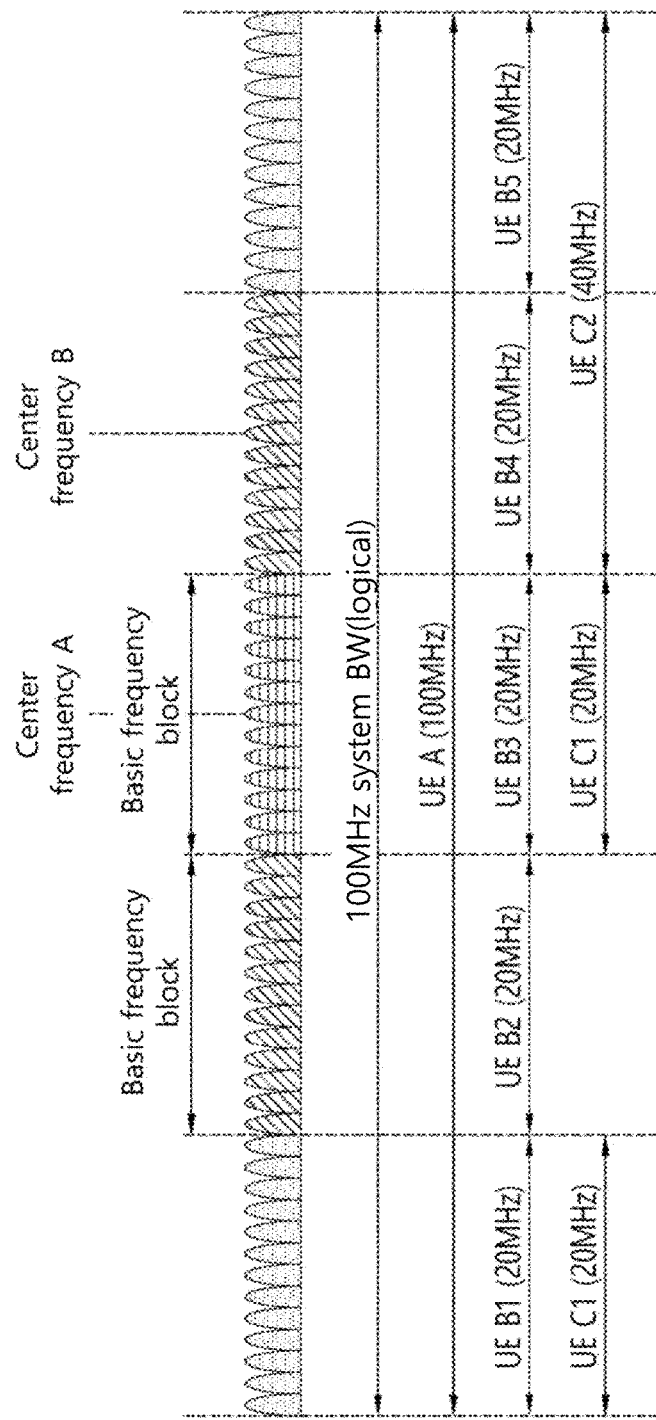
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
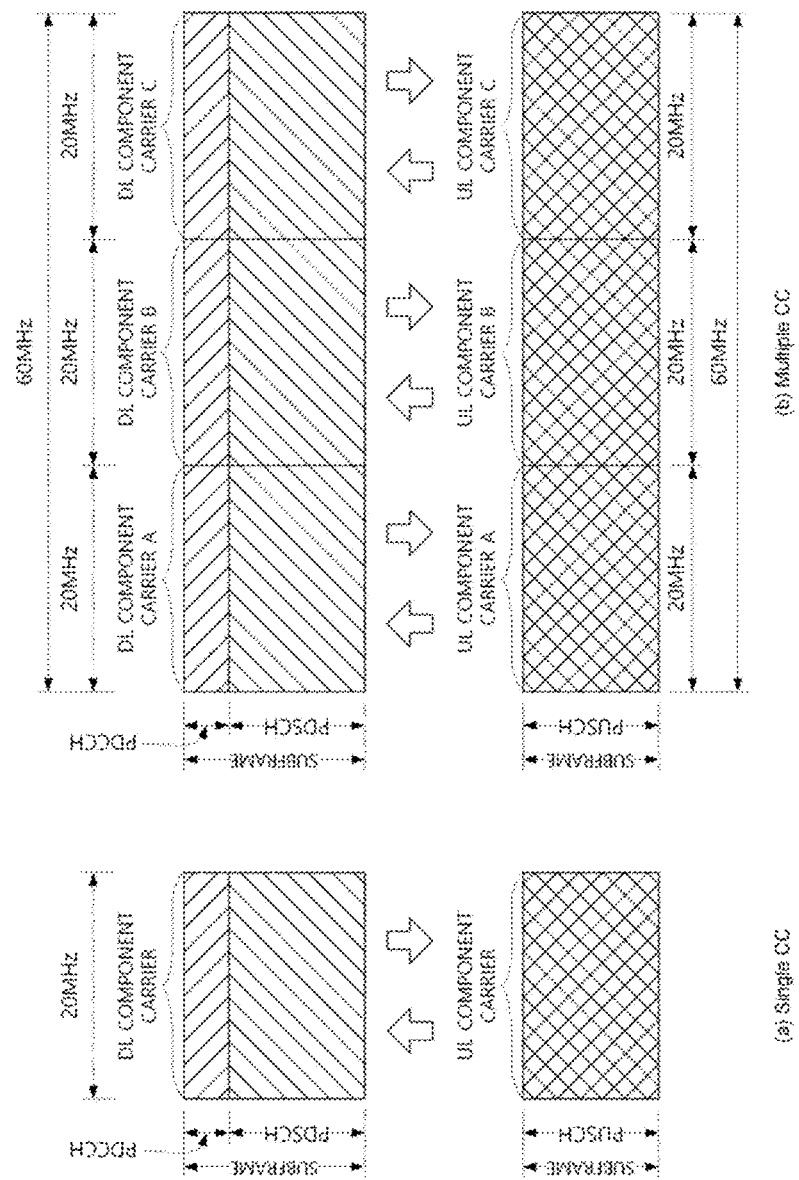
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs may not be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
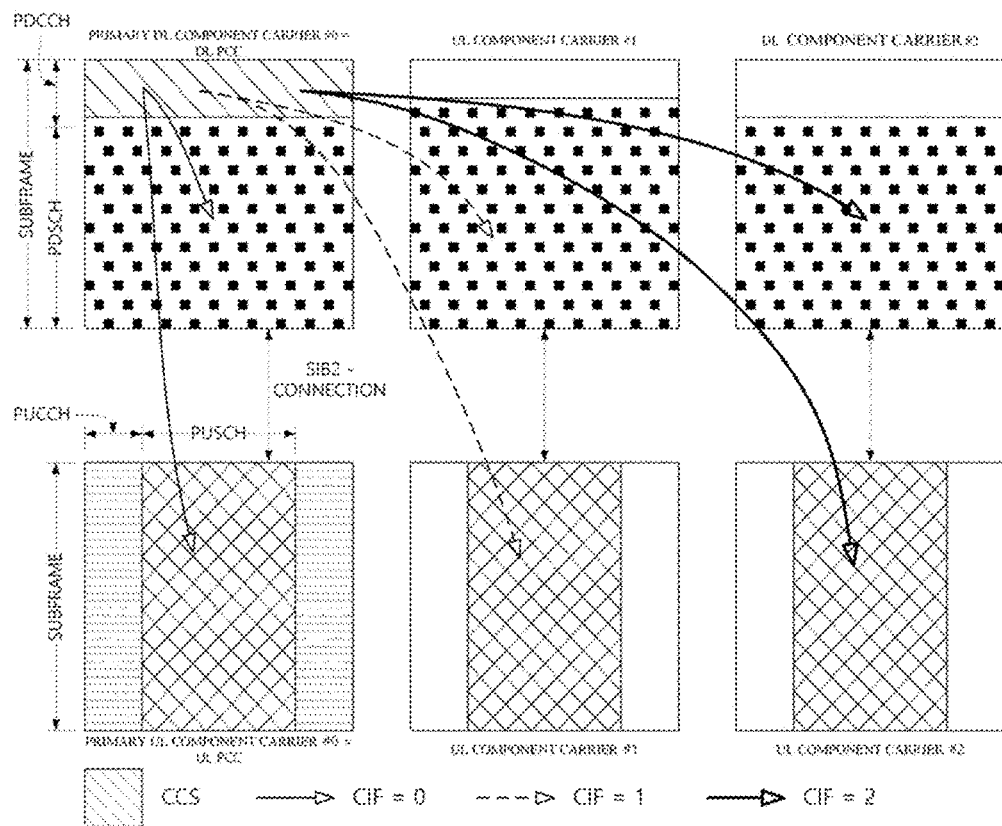
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
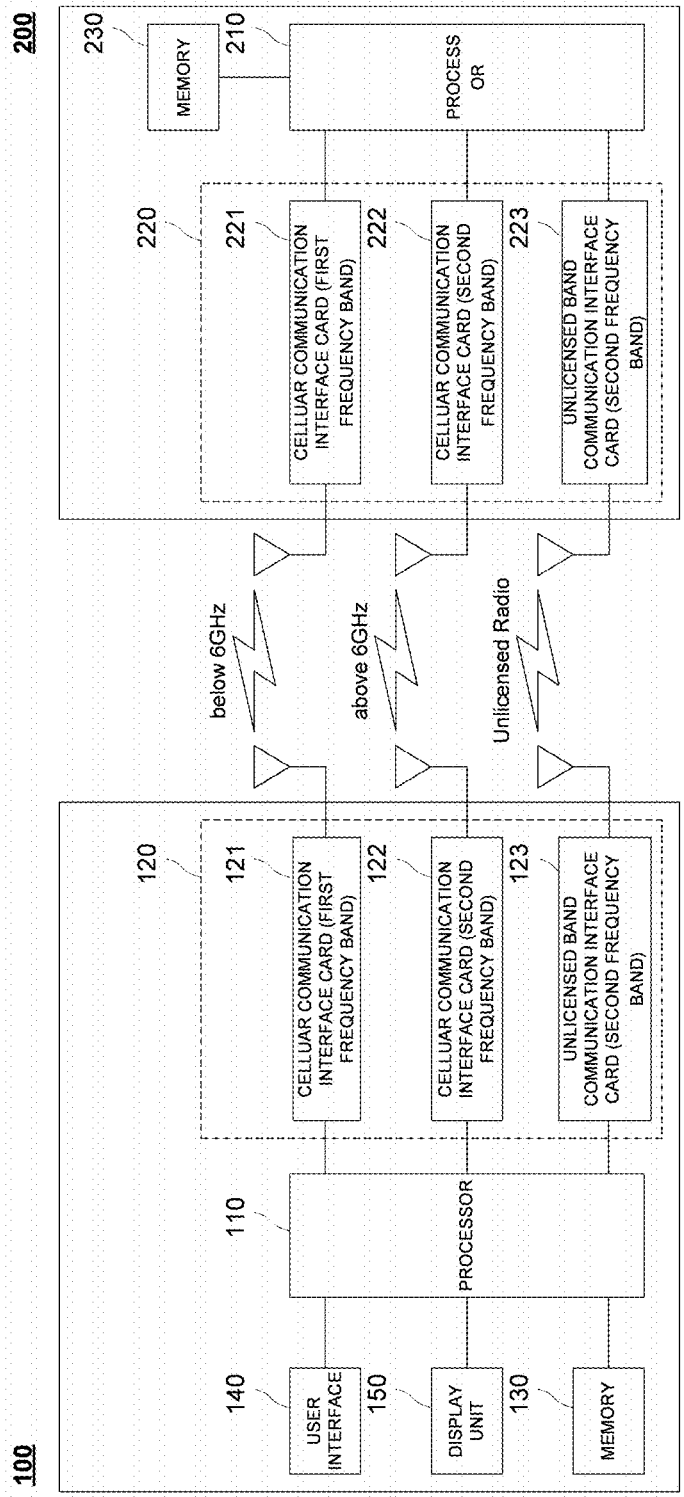
FIG. 11 is a block diagram illustrating configuration of a user equipment and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In the NR wireless communication system, the user equipment may transmit a codebook including hybrid automatic repeat request (HARQ)-ACK information to signal whether reception of a downlink signal or channel has succeeded. The HARQ-ACK codebook includes one or more bits indicating whether reception of a downlink signal or channel has succeeded. Here, the downlink channel may include at least one of a physical downlink shared channel (PDSCH), a semi-persistence scheduling (SPS) PDSCH, and a PDCCH for releasing the SPS PDSCH. The HARQ-ACK codebook may be divided into a semi-static HARQ-ACK codebook (or first-type codebook) and a dynamic HARQ-ACK codebook (or second-type codebook). The base station may set one of the two HARQ-ACK codebooks for the user equipment. The user equipment may use a HARQ-ACK codebook set for the user equipment.

When the semi-static HARQ-ACK codebook is used, the base station may use an RRC signal to configure the number of bits of the HARQ-ACK codebook and information for determining which downlink signal or channel is successfully received by each bit of the HARQ-ACK codebook. Therefore, it is not necessary for the base station to signal information required for transmitting the HARQ-ACK codebook to the user equipment each time transmission of the HARQ-ACK codebook is necessary.

When the dynamic HARQ-ACK codebook is used, the base station may signal information required for generating the HARQ-ACK codebook through a PDCCH (or DCI). In detail, the base station may signal the information required for generating the HARQ-ACK codebook through a down assignment index (DAI) field of a PDCCH (or DCI). In a specific embodiment, a DAI represents information about the number of bits of the HARQ-ACK codebook and about for which channel or signal each bit of the HARQ-ACK codebook indicates reception success or failure. The user equipment may receive the DAI field through a PDCCH (or DCI) for scheduling a PDSCH. A value of the DAI field may be divided into a counter-DAI and a total DAI. The total-DAI indicates the number of downlink signals or channels for which reception success or failure is indicated through the HARQ-ACK codebook until a current monitoring occasion (MO). The counter-DAI indicates a HARQ-ACK codebook bit indicating reception success or failure of downlink signals or channels among the downlink signals or channels for which reception success or failure is indicated through the HARQ-ACK codebook until a current cell of a current monitoring occasion. A PDCCH (or DCI) for scheduling a PDSCH may include a value of the counter-DAI corresponding to a scheduled PDSCH. Furthermore, a PDCCH (or DCI) for scheduling a PDSCH may include a value of the total-DAI corresponding to a scheduled PDSCH. The user equipment may determine the number of bits of the dynamic HARQ-ACK codebook on the basis of information signaled by a PDCCH (or DCI). In detail, the user equipment may tion and control resource set length (duration), or frequency resource information. In this case, information related to the search space may include at least one of an identifier (ID) of the search space through which the UE may detect the PDCCH including the DCI, a format of the DCI that may be detected in each search space, a detection duration, or resource information.

Then, the UE may receive the DCI by detecting the PDCCH in the monitoring occasion based on the RRC configuration information (S12020). The UE may acquire the DCI by detecting the PDCCH in a specific search space of the monitoring occasion according to the type of service and/or data based on the RRC configuration information.

In this case, the DAI included in the DCI may be configured with different bits according to the format of the DCI. For example, in DCI Format 1_0, the DAI may be configured with 2 bits, and in DCI Format 1_1, may be configured with 1 bit for a semi-static HARQ-ACK codebook, and with 2 bits for a dynamic-HARQ-ACK codebook.

Table 3 below shows an example of bits of DAI according to the DCI format.

TABLE 3

| | Counter-DAI | Total DAI | UL DAI |
|---|---|---|---|
| DCI format 0_0 | — | — | — |
| DCI format 0_1 | — | — | For TB-based transmission 2 bits<br>For CBG transmission 4 bits (2 bits for TB-based reception, 2 bits for CBG-based reception) |
| DCI format 0_2 | — | — | if Downlinkassignmentindex-ForDCIFormat0_2 is not configured,<br>0 bit<br>Otherwise,<br>for TB-based reception 2 bits<br>for CBG-based reception 4 bits (2 bits for TB-based reception, 2 bits for CBG-based reception) |
| DCI format 1_0 | 2 bits | 0 bits | — |
| DCI format 1_1 | 2 bits | 2 bits | — |
| DCI format 1_2 | if Downlinkassignmentindex-ForDCIFormat1_2 is not configured,<br>0 bit<br>Otherwise<br>1 or 2 bits | if Downlinkassignmentindex-ForDCIFormat1_2 is not configured,<br>0 bit<br>Otherwise<br>0 bit or 2 bits | — | determine the number of bits of the dynamic HARQ-ACK codebook on the basis of the DAI of a PDCCH (or DCI).

Figure 12:
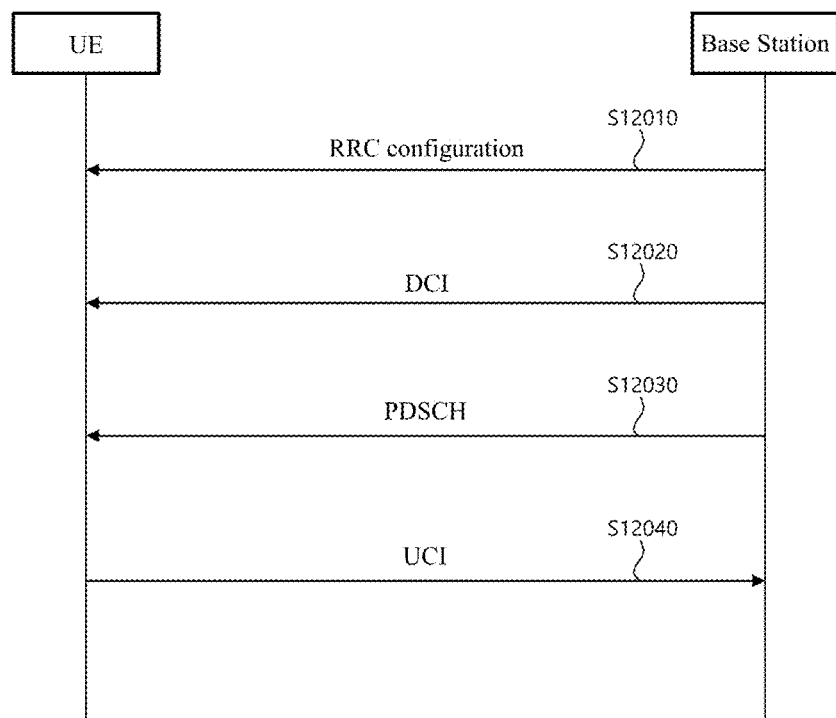
FIG. 12 is a flowchart illustrating an example of signaling between a user equipment and a base station to which an embodiment of the present disclosure is applicable.

FIG. 12 is a flowchart illustrating an example of signaling between a user equipment and a base station to which an embodiment of the present disclosure is applicable.

Referring to FIG. 12, a UE receives, from a base station, RRC configuration information including information for receiving downlink control information (DCI)(S12010).

For example, the RRC configuration information may include information related to a control resource set (CORSET) and a search space for the UE to detect a PDCCH including downlink control information. In this case, the information related to the control resource set may include at least one of an identifier (ID) of a control resource set through which the UE may detect the PDCCH including the DCI, control channel element (CCE) configuration informa- In addition, the UE may be allocated a resource for the reception of the PDSCH or the transmission of the PUSCH through the PDCCH (or DCI).

Then, the UE may receive the PDSCH or transmit the PUSCH to the base station through the allocated resource (S12030). If the UE receives the PDSCH from the base station, the UE may generate a HARQ-ACK codebook indicating the ACK/NACK of the received PDSCH based on the DAI value included in the PDCCH (or DCI) for scheduling of the PDSCH, and transmit, to the base station, the generated HARQ-ACK codebook by including it in uplink control information (UCI) (S12040).

FIG. 13(a) and FIG. 13(b) illustrate an example of a method for counting the number of PDSCHs transmitted from a base station by a user equipment based on a pseudo code that is applicable to an embodiment of the present disclosure.

(a) and (b) of FIG. 13 illustrates an example of a method for generating and transmitting a HARQ-ACK codebook based on a stored counter-DAI value, a counter-DAI value transmitted through a specific DCI, and a stored total-DAI value.

Specifically, referring to (a) of FIG. 13, the UE may set the counter-DAI value of the PDCCH (or DCI) received in a serving cell c of a monitoring occasion m to be $V_{C\text{-}DAI,c,m}^{DL}$, the stored counter-DAI value to be $V_{temp}$, and the stored total-DAI value (total-DAI) to be $V_{temp2}$. In this case, a range $T_D$ of a value that may be expressed as the number of bits of the DAI may be calculated by Equation 1 below.

$$T_D = 2N_{C\text{-}DAI}^{DL} \quad \text{[Equation 1]}$$

Here, the monitoring occasion index m and a cell index c are omitted. Tables 4 and 5 show ranges of values in which the counter-DAI or total-DAI is expressed according to the number of bits of the counter-DAI or the number of bits of the total-DAI. Table 4 shows an example when the number of bits of the counter-DAI or the number of bits of the total-DAI is 2 bits, and Table 5 shows an example when the number of bits of the counter-DAI or the number of bits of the total-DAI is 1 bit.

TABLE 4

| DAI MSB, LSB | $V_{C\text{-}DAI}^{DL}$ or $V_{T\text{-}DAI}^{DL}$ | Number of {serving cell, PDCCH monitoring occasion}-pair(s) in which PDSCH transmission(s) associated with PDCCH or PDCCH indicating SPS PDSCH release is present, denoted as Y and Y ≥ 1 |
|---|---|---|
| 0, 0 | 1 | (Y − 1) mod $T_D$ + 1 = 1 |
| 0, 1 | 2 | (Y − 1) mod $T_D$ + 1 = 2 |
| 1, 0 | 3 | (Y − 1) mod $T_D$ + 1 = 3 |
| 1, 1 | 4 | (Y − 1) mod $T_D$ + 1 = 4 |

TABLE 5

| DAI | $V_{C\text{-}DAI}^{DL}$ | Number of {serving cell, PDCCH monitoring occasion}-pair(s) in which PDSCH transmission(s) associated with PDCCH or PDCCH indicating SPS PDSCH release is present, denoted as Y and Y ≥ 1 |
|---|---|---|
| 0 | 1 | (Y − 1) mod $T_D$ + 1 = 1 |
| 1 | 2 | (Y − 1) mod $T_D$ + 1 = 2 |

In this case, the pseudo code for generating the HARQ-ACK codebook is shown in Table 6 below.

TABLE 6

```
Set m = 0 - PDCCH with DCI format scheduling PDSCH reception or SPS PDSCH release monitoring occasion index:
    lower index corresponds to earlier PDCCH monitoring occasion
Set j = 0
Set V_temp = 0
Set V_temp2 = 0
Set V_s = Ø
Set N_cells^DL to the number of cells configured by higher layers for the UE
Set M to the number of PDCCH monitoring occasion(s)
while m < M
    Set c = 0 - serving cell index: lower indexes correspond to lower RRC indexes of corresponding cell
    while c < N_cells^DL
        if PDCCH monitoring occasion m is before an active DL BWP change on serving cell c , or an active UL BWP
        change on the PCell and an active DL BWP change is not triggered in the PDCCH monitoring occasion m
            c = c +1,
        else
            if there is a PDSCH on serving cell c associated with PDCCH in PDCCH monitoring occasion m , or there
            is a PDCCH indicating SPS PDSCH release on serving cell c
                if V_C-DAI,c,m^DL ≤ V_temp
                    j = j + 1
                end if
                V_temp = V_C-DAI,c,m^DL
                if V_T-DAI,m^DL = Ø
                    V_temp2 = V_C-DAI,c,m^DL
                else
                    V_temp2 = V_T-DAI,m^DL
                end if
                if harq-ACK-SpatialBundlingPUCCH is not provided and the UE is configured by
                maxNrofCodeWordsScheduledByDCI with reception of two transport blocks for at least one configured DL
                BWP of at least one serving cell,
                    õ_{2·T_D·j+2(V_C-DAI,c,m^DL −1)}^ACK = HARQ-ACK information bit corresponding to the first transport block of this
                    cell
                    õ_{2·T_D·j+2(V_C-DAI,c,m^DL −1)+1}^ACK = HARQ-ACK information bit corresponding to the second transport block of
                    this cell
                    V_s = V_s ∪ {2 · T_D · j + 2(V_C-DAI,c,m^DL − 1), 2 · T_D · j + 2(V_C-DAI,c,m^DL − 1) + 1}
                elseif harq-ACK-SpatialBundlingPUCCH is provided to the UE and m is a monitoring occasion for
                PDCCH with DCI format that supports PDSCH reception with two transport blocks and the UE is
                configured by maxNrofCodeWordsScheduledByDCI with reception of two transport blocks in at least one
                configured DL BWP of a serving cell,
                    õ_{T_D·j+V_C-DAI,c,m^DL −1}^ACK = binary AND operation of the HARQ-ACK information bits corresponding to the
                    first and second transport blocks of this cell
                    V_s = V_s ∪ {T_D · j + V_C-DAI,c,m^DL − 1}
                else
                    õ_{T_D·j+V_C-DAI,c,m^DL −1}^ACK = HARQ-ACK information bit of this cell
                    V_s = V_s ∪ {T_D · j + V_C-DAI,c,m^DL − 1}
                end if
            end if
            c = c + 1
        end if
    end while
```

TABLE 6-continued

```
    m = m + 1
end while
if V_temp2 < V_temp
    j = j + 1
end if
if harq-ACK-SpatialBundlingPUCCH is not provided to the UE and the UE is configured by
maxNrofCodeWordsScheduledByDCI with reception of two transport blocks for at least one configured DL BWP of a
serving cell,
        O^ACK = 2 · (T_D · j + V_temp2)
else
        O^ACK = T_D · j + V_temp2
end if
```

In this case, using the pseudo code of Table 6, the UE may compare $V_{temp}$ and $V_{C\text{-}DAI,c,m}$ values as illustrated in (a) of FIG. 13 to determine whether PDSCH reception is omitted due to failure of reception of the PDCCH (or DCI) for scheduling of the PDSCH transmitted from the base station.

For example, as illustrated in (a) of FIG. 13, when the UE receives the 2-bit counter-DAI configuration, the UE may calculate $T_D=2^2=4$ and see that the range that may be expressed as the number of bits of the counter-DAI is from 1 to 4. When one PDCCH (or DCI) is received, it may be recognized that the PDSCH is continuously transmitted without missing when the value $V_{C\text{-}DAI,c,m}$ of the counter-DAI of the PDCCH (or DCI) is '1' and the value of $V_{temp}$ is '4'. However, when receiving one PDCCH (or DCI), the UE may recognize that the PDSCH scheduled by the PDCCH (or DCI) with the value of counter-DAI of '1' is missed when the value $V_{C\text{-}DAI,c,m}$ of the counter-DAI of the PDCCH (or DCI) is '2' and the value of $V_{temp}$ is '4', and may indicate the HARQ-ACK for this PDSCH as NACK.

Furthermore, as illustrated in (b) of FIG. 13, the UE may recognize the omission of transmission of the PDSCH scheduled by the PDCCH of the base station by comparing the stored values of $V_{temp2}$ and $V_{temp}$, which are the stored total-DAI values. For example, as illustrated in (b) of FIG. 13, when the UE receives the 2-bit total-DCI configuration, $T_D=2^2=4$ is calculated and the range that may be expressed in the number of bits of the total-DAI is 1 to 4. When the value of the total-DAI $V_{temp2}$ of the PDCCH (or DCI) last received by the UE is '1' and the value of $V_{temp}$ is '4', it may be recognized that the PDSCH has not been missed since the last received PDCCH. However, when the total-DAI value $V_{temp2}$ of the PDCCH (or DCI) last received by the UE is '2' and the value of $V_{temp}$ is '4', the UE may recognize that the PDSCH scheduled by one PDCCH (or DCI) has been missed since the last received PDCCH, and may indicate the HARQ-ACK for this PDSCH as NACK.

In Table 6, the size of the UE's final HARQ-ACK codebook may be determined by a value of $O^{ACK}$.

A new DCI format for providing ultra-reliable and low-latency communication (URLLC) services may be introduced. This new DCI format has a feature that is capable of setting the length of each field of DCI in order to reduce the bit size. Hereinafter, the newly introduced DCI format will be referred to as DCI format 0_2 and DCI format 1_2.

DCI format 0_2 is a DCI format for scheduling of a PUSCH, and DCI format 1_2 is a DCI format for scheduling of a PDSCH.

In addition, in Rel-16 NR, up to two HARQ-ACK codebooks may be generated according to the service type. For example, one HARQ-ACK codebook may be generated by collecting HARQ-ACK information about PDSCHs for eMBB service, and one HARQ-ACK codebook may be generated by collecting HARQ-ACK information about PDSCHs for URLLC service. In DCI formats 1_0, 1_1, and 1_2 for scheduling of PDSCH, it needs to be indicated in which HARQ-ACK codebook HARQ-ACK information about the scheduled PDSCH is included. In this case, various methods may be used as a method for indicating HARQ-ACK information.

For example, by adding a separate 1-bit field to the DCI format, index 1 may indicate HARQ-ACK for a PDSCH having a high priority such as the URLLC service, and index 0 may indicate HARQ-ACK for a PDSCH having a low priority such as the eMBB service.

Alternatively, the HARQ-ACK of the PDSCH for URLLC and the HARQ-ACK of the PDSCH for eMBB may be distinguished by the following parameters and/or methods.

The HARQ-ACKs may be distinguished by different RNTIs. That is, based on different RNTIs of the PDCCH (or DCI) for scheduling of the PDSCH of the URLLC and the PDCCH (or DCI) for scheduling of the PDSCH of the eMBB, the UE may generate the HARQ-ACK codebook by distinguishing between the HARQ-ACK of the PDSCH for the URLLC and the HARQ-ACK of the PDSCH for the eMBB.

The HARQ-ACKs may be distinguished according to a CORESET in which the PDCCH is transmitted. That is, based on the CORESET in which the PDSCH of the URLLC is transmitted and the CORESET in which the PDSCH of the eMBB is transmitted, the UE may generate the HARQ-ACK codebook by distinguishing between the HARQ-ACK of the PDSCH for the URLLC and the HARQ-ACK of the PDSCH for the eMBB.

The HARQ-ACKs may be distinguished according to the DCI format. That is, based on the DCI format for scheduling of the PDSCH of the URLLC and the DCI format for scheduling of the PDSCH of the eMBB, the UE may generate the HARQ-ACK codebook by distinguishing between the HARQ-ACK of the PDSCH for the URLLC and the HARQ-ACK of the PDSCH for the eMBB. For example, DCI format 0_0 or DCI format 10 always schedules a PUSCH or a PDSCH having a low priority. In addition, DCI format 0_1 or DCI format 1_1 always schedules a PUSCH or a PDSCH having a low priority. In addition, DCI format 0_2 or DCI format 1_2 always schedules the PUSCH or the PDSCH having a high priority.

Based on the methods described above, the UE may know the priority of each PDSCH transmitted from the base station, and may generate the HARQ-ACK codebook by collecting HARQ-ACKs of PDSCHs corresponding to the same priority. Hereinafter, the HARQ-ACK codebook described in the present disclosure refer to a HARQ-ACK codebook for HARQ-ACKs of PDSCHs corresponding to the same priority, unless otherwise stated.

Figure 14:
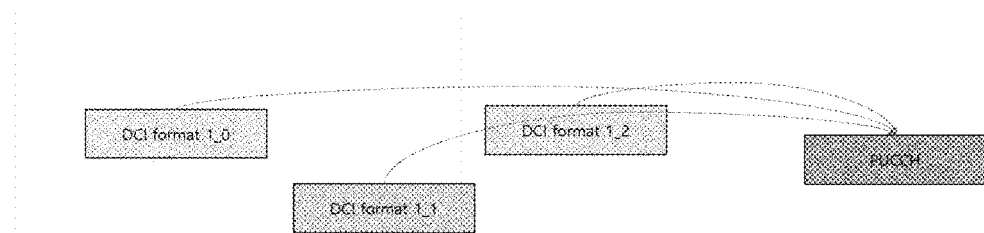
FIG. 14 illustrates an example of a method for transmitting HARQ-Ack based on downlink control information having a different format according to an embodiment of the present disclosure.

FIG. 14 illustrates an example of a method for transmitting a HARQ-ACK based on downlink control information having a different format according to an embodiment of the present disclosure.

The DAI received from the PDCCH (or DCI) includes the counter-DAI and the total-DAI, and the counter-DAI and the total-DAI may be each configured with a maximum of 2 bits. However, in DCI format 1_0, the number of bits of the counter-DAI is fixed to 2 bits, and in DCI format 1_1, the number of bits of the counter-DAI may be set to be fixed to 2 bits and the number of bits of the total-DAI may be set to be fixed to 2 bits.

The length of each DCI field of DCI format 1_2 and DCI format 0_2 for the UE may be set by the base station. For example, the base station may set the length of the DAI field for generating the HARQ-ACK codebook in DCI format 1_2. In DCI format 1_2, the length of the DAI field may be set to be one of 0 bits, 1 bit, 2 bits, or 4 bits. If the length of the DAI field is set to be 1 bit or 2 bits, the counter-DAI is 1 bit or 2 bits and total-DAI is 0 bits. If the length of the DAI field is set to be 4 bits, the counter-DAI is 2 bits and the total-DAI is 2 bits.

Referring to FIG. 14, a PDSCH corresponding to one HARQ-ACK codebook of one UE may be scheduled according to DCI format 1_0, DCI format 1_1, or DCI format 1_2. That is, the DCI formats of the PDSCH corresponding to one HARQ-ACK codebook may have counter-DAI bit-sizes of different lengths. Hereinafter, when DCI formats have counter-DAI bit-sizes of different lengths, a method for generating the HARQ-ACK codebook will be described.

FIG. 15(a) and FIG. 15(b) illustrate another example of a method for transmitting a HARQ-Ack based on downlink control information having a different format according to an embodiment of the present disclosure.

Referring to FIG. 15(a) and FIG. 15(b), the UE may generate a HARQ-ACK codebook for a PDSCH scheduled by each PDCCH having a different DCI format and transmit it to the base station.

Specifically, as described above, when the DCI format is changed, the number of bits of the DAI field included in each piece of DCI may also vary. In this case, the UE may generate a HARQ-ACK codebook including a HARQ-ACK bit of the PDSCH scheduled by the PDCCH (or DCI) of the DAI field having a different number of bits and transmit it to the base station.

In this case, it is difficult for the UE to count the received DAI, since the number of bits of the DAI field is different. That is, when the bit value of the DAI field of the first PDCCH (or DCI) is "0" and the bit value of the DAI field of the second DCI is "11", it is difficult for the UE to determine whether the two received PDSCHs are continuously transmitted.

Accordingly, when the number of bits of the counter-DAI of each of the received PDCCHs (or DCIs) is different, the UE may recognize the order of the received PDSCH by matching the number of bits of the counter-DAI to be the same. That is, the UE may match the numbers of bits by recognizing that only some of the bits of the counter-DAI with a larger number of bits are valid bits, and may match the numbers of bits by extending and interpreting the bits of the counter-DAI with a smaller number of bits.

Proposal 1: Generating a HARQ-ACK codebook by recognizing only some of the bits of counter-DAI as valid bits.

When the numbers of bits of counter-DAI fields of the DCI format monitored by the UE are different, only some of the bits of the counter-DAI having a larger number of bits are recognized as valid bits to generate the HARQ-ACK codebook. In this case, the number of valid bits is equal to the number of bits of the DAI field with a smaller number of bits among the DAI fields of the received PDCCH (or DCI). In addition, in DCI format 1_0 and DCI format 1_1, the number of bits of the counter-DAI may be fixed to 2 bits, and in DCI format 1_2, the number of bits of the counter-DAI may be set to be 0 bits, 1 bit, or 2 bits, and thus the DAI field with a smaller number of bits among the DAI fields has the same number of bits as the number of bits of the counter-DAI included in DCI format 1_2. That is, when the UE is configured to monitor DCI format 1_2, the UE may recognize that the number of bits of the counter-DAI of DCI format 1_2 is the number of valid bits, and may recognize that among the 2-bit counter-DAI of DCI format 1_0 or DCI format 1_1, only the valid number of bits are valid bits for the counter-DAI.

Specifically, when the bit size of the counter-DAI of DCI format 1_2 is set to be the $N_{C\text{-}DAI}$ bit, only the $N_{C\text{-}DAI}$ bit(s) may be determined as being valid among the 2 bits of the counter-DAI fields of DCI format 1_0 and DCI format 1_1, which are other formats of DCI. In this case, the bit(s) determined as being valid may be the LSB $N_{C\text{-}DAI}$ bit(s) or the MSB $N_{CDAI}$ bit(s).

In addition, the counter-DAI value may be determined according to the value of the $N_{C\text{-}DAI}$ bit(s). For example, when the value of $N_{C\text{-}DAI}$ is '1', the number of the valid bits is 1. In this case, when the binary value of the valid bit is 0, the counter-DAI value is 1, and when the binary value of the valid bit is 1, the counter-DAI value is 2.

When the value of $N_{C\text{-}DAI}$ is '2', the number of valid bits is 2. In this case, when the binary value of the valid bits is 00, the counter-DAI value is 1, and when the binary value is 01, the counter-DAI value is 2. Furthermore, when the binary value is 10, the counter-DAI value is 3, and when the binary value is 11, the counter-DAI value is 4.

For example, when $N_{C\text{-}DAI}$, which is the bit-size of the counter-DAI of DCI format 1_2, is configured to be 1 bit as illustrated in (a) of FIG. 15, the UE may recognize that only 1 bit of the LSB or MSB among 2 bits of the counter-DAIs of DCI format 1_0 and DCI format 1_1 is the number of valid bits of the counter-DAI.

That is, among the numbers of bits of the counter-DAI fields of the received DCI, the number of bits of the counter-DAI field with the smallest number of bits is determined as the number of valid bits, and by recognizing that only some bits of the LSB or MSB are valid among the bits of the counter-DAI fields of the remaining DCI, the bit sizes of the counter-DAIs of the received pieces of DCI may be identically matched.

The UE may generate the HARQ-ACK codebook using only the valid $N_{C\text{-}DAI}$ bit in the counter-DAI field of each DCI format. For example, (a) of FIG. 15 illustrates a binary value of counter-DAI when the value of $N_{C\text{-}DAI}$, which is a valid bit-size of counter-DAI of DCI format 1_2, is set to be 1 bit.

As illustrated in (a) of FIG. 15, the counter-DAI of DCI_format 1_1 may have binary values of 00, 01, 10, and 11 in 2 bits, but only 1 bit, which is the LSB, may be valid. Invalid binary values are marked with x. In the same monitoring occasion, the counter-DAI value may be incremented by one according to the ascending order of the cell index.

Specifically, the value of counter-DAI is a value determined according to the number of PDCCHs transmitted up to the current cell of the current monitoring occasion. If X PDCCHs have been transmitted so far (X−1 mod $2^{N_{C\text{-}DAI}}$), the counter-DAI value is determined as +1. The UE may determine whether there is a PDCCH that has failed to be received by using the value of the counter-DAI.

When the format of the received DCI is DCI format 1_1 and the format of the subsequently received DCI is format 1_1, the UE may set the valid bit of the counter-DAI to be 1 bit. In this case, only the MSB or LSB of the counter-DAI field of DCI format 1_1 may be recognized as a valid bit, and the invalid bit of the counter-DAI is not used to calculate the value of the counter-DAI.

For example, when the number $N_{C\text{-}DAI}$ of bits of the counter-DAI of DCI format 1_2 received as illustrated in (a) of FIG. 15 is 1 bit, the UE may determine that the number of valid bits is 1 bit, and even if the number of bits of the counter-DAI of DCI format 1_1 is set to be 2 bits, only 1 MSB or LSB among the 2 bits may be used to determine the counter-DAI value. Accordingly, the invalid 1 bit marked with 'x' in (a) of FIG. 15 is not used to determine the counter-DAI value.

If the bit of counter-DAI of DCI format 1_2 is '0', the value of counter-DAI may be determined as 1. In this case, when 2 bits of the counter-DAI of DCI format 1_1 transmitted next are '11' or '01', the UE may determine the value of the counter-DAI by using only '1', which is the value of the LSB, which is a valid bit. Therefore, the value of the counter-DAI of DCI format 1_1 may be recognized as 2.

Additionally, Proposal 1 may be interpreted as follows. When the bits of the 2-bit counter-DAI of DCI format 1_0 or DCI format 1_1 are '00', the UE determines the value of the counter-DAI as 1, and when '01', determines the value of the counter-DAI as 2, when '10', determines the value of counter-DAI as 3, and when '11', determines the value of counter-DAI as 4.

When the UE receives a configuration in which the number of bits of the counter-DAI of DCI format 1_2 is 1 bit, the UE may determine the value of the counter-DAI as 1 or 2. Here, when the value of the 2-bit counter-DAI is $C_2$, $C_2$ has one of 1, 2, 3, and 4. When the value of 1-bit counter-DAI is $C_1$, $C_1$ has one of 1 and 2.

In this case, the value $C_2$ of the 2-bit counter-DAI may be converted into the same bit value as the value $C_1$ of the 1-bit counter-DAI through $C_1=(C_2-1) \bmod 2+1$. This method has the same effect as determining that 1 bit of the LSB is valid and interpreting the 1 LSB as the 1-bit counter-DAI value in Proposal 1.

When the counter-DAI value of the previously received PDCCH (or DCI) is 1 and the counter-DAI value of the subsequently received PDCCH (or DCI) is 1, the UE may recognize that the two PDCCHs are not transmitted consecutively, and that at least one PDCCH has been transmitted between the two PDCCHs, but the UE does not receive it.

However, when the reception of two consecutive PDCCHs fails, the UE may not recognize it. That is, when the $N_{C\text{-}DAI}$ is set to be 1 bit, it is possible to detect a reception failure of at most one PDCCH, but it is not possible to detect a reception failure of two or more consecutive PDCCHs.

As described above, in DCI formats 1_0 and 1_1, counter-DAI is fixed to 2 bits. Therefore, in DCI formats 1_0 and 1_1, the counter-DAI where the number of bits is 2 may detect a reception failure of up to three consecutive PDCCHs. However, the PDCCH reception failure detection performance may be degraded by setting the number of valid bits to be 1 bit, which is the number of bits of the counter-DAI of DCI format 1_2 according to Proposal 1.

Proposal 2: Generating a HARQ-ACK codebook based on the greatest number of bits among bits of the counter-DAI.

In the case of Proposal 1, as described above, since the number of valid bits of the counter-DAI is only 1 bit, it is not possible to recognize that two or more consecutive PDCCHs are not detected. Therefore, it may not be easy to detect the reception failure of the PDCCH.

In order to solve the problem, when the number of bits of the counter-DAI varies depending on the format of DCI, the value of counter-DAI may be determined by extending and interpreting the number of bits of the counter-DAI based on the number of more bits.

Specifically, when the counter-DAI of DCI format 1_2 is configured with the $N_{C\text{-}DAI}$ bit in bit-size, the $N_{C\text{-}DAI}$-bit counter-DAI is extended and interpreted as the 2-bit counter-DAI value. In addition, it may be determined that the 2-bit counter-DAI for DCI format 1_0 and DCI format 1_1 is valid.

For example, as illustrated in (b) of FIG. 15, DCI format 1_0 and DCI format 1_1 include a two-bit counter-DAI, and thus, when bits of the counter-DAI are '00' in binary number, the counter-DAI value may be 1, and when the bits are '01' in binary number, the counter-DAI value may be 2. In addition, when the bits of the counter-DAI are 10 in binary number, the counter-DAI value may be 3, and when the bits of the counter-DAI are 11 in binary number, the counter-DAI value may be 4.

In this case, when the value of $N_{C\text{-}DAI}$, which is the bit size of the counter-DAI of DCI format 1_2, is 1 bit, the UE may extend and interpret the number of bits of the counter-DAI of DCI format 1_2 as 2 bits. For example, when 1 bit of counter-DAI of DCI format 1_2 is extended and interpreted as 2 bits when it is '0', the counter-DAI may have a bit value of '00' or '10'. Therefore, the counter-DAI value may be extended and interpreted as 1 or 3.

Alternatively, when 1 bit of counter-DAI of DCI format 1_2 is extended and interpreted as 2 bits when it is '1', the counter-DAI may have a bit value of '01' or '11'. Therefore, the counter-DAI value may be extended and interpreted as 2 or 4.

When the counter-DAI with a 1-bit size of DCI format 1_2 is extended and interpreted as 2 bits by Proposal 2, the value of the counter-DAI may have two or more candidate values by the extended interpretation. In this case, the UE may recognize that the value with the smallest number of non-consecutive PDCCHs is the value of the counter-DAI. That is, when interpreted by extending the number of bits of the counter-DAI, the UE may determine the value corresponding to the value with the smallest number of undetected PDCCHs as the value of the counter-DAI.

For example, when the value of the 2-bit counter-DAI of the previously received DCI is 3 and the bit of the 1-bit counter-DAI of the subsequently received PDCCH (or DCI) is '1', the UE may determine, as the counter-DAI, the value 4, which is the value with the smallest number of undetected PDCCHs out of the candidate value 2 or 4 that may be the value of the counter-DAI, by extending and interpreting the 1-bit counter-DAI as 2 bits. In other words, when a determination is made that the counter-DAI of the subsequently received PDCCH (or DCI) is 2, a determination is made that the receptions of two PDCCHs (or DCIs) with the counter-DAI values of 4 and 1 have failed. However, when a determination is made that the counter-DAI of the received PDCCH (or DCI) is 4, the UE determines that there is no PDCCH (or DCI) that has failed to be received. When the probability that the UE fails to receive the PDCCH is p, the probability of determining that the counter-DAI is 2 and that the reception of two consecutive PDCCHs (or DCIs) fails is $p^2$, and the probability determining that the counter-DAI is 4 and that there is no PDCCH (or DCI) reception failure is 1-p. In general, p is a very small value for the base station to allow the UE to successfully receive the PDCCH (or DCI). Therefore, counter-DAI 4 with probability 1-p occurs more frequently than counter-DAI 2 with probability $p^2$. Therefore, in the above case, the value of the counter-DAI is more likely to be 4 than 2, and thus it is desirable to determine the counter-DAI as 4.

Table 7 below shows an example of values of the counter-DAI extended and interpreted for the counter-DAI of the previously received DCI when the bit of the counter-DAI is extended and interpreted. Here, the counter-DAI is 1 bit, and the value of the counter-DAI of the previously received DCI is 2 bits.

TABLE 7

| Counter-DAI | $V_{temp}$ | | | |
|---|---|---|---|---|
| | 1(00) | 2(01) | 3(10) | 4(11) |
| 1 or 3(0) | 3 | 3 | 1 | 1 |
| 2 or 4(1) | 2 | 4 | 4 | 2 |

In Table 7, the number in parentheses means each bit value.

For another example of Proposal 2, DCI format 1_0 and DCI format 1_1 include a two-bit counter-DAI, and thus, when bits of the counter-DAI are '00' in binary number, the counter-DAI value may be 1, and when the bits are '01' in binary number, the counter-DAI value may be 2. In addition, when the bits of the counter-DAI are 10 in binary number, the counter-DAI value may be 3, and when the bits of the counter-DAI are 11 in binary number, the counter-DAI value may be 4.

In this case, when the value of $N_{C-DAI}$, which is the bit size of the counter-DAI of DCI format 1_2, is 0 bits, the UE may extend and interpret the number of bits of the counter-DAI of DCI format 1_2 as 2 bits. In this case, since the size of the counter-DAI is 0 bits, when it is extended and interpreted as 2 bits, the counter-DAI of 0 bits may have four candidate values.

When the counter-DAI value is extended and interpreted as a value with the smallest number of undetected PDCCHs out of the four candidate values, the UE may determine the counter-DAI value as a value consecutive to the counter-DAI value of the previously received DCI.

Table 8 below shows an example of the counter-DAI values extended and interpreted for the counter-DAI of the previously received DCI when the bit of the counter-DAI is extended and interpreted. Here, the counter-DAI is 0 bits, and the value of the counter-DAI of the previously received DCI is 2 bits.

TABLE 8

| Counter-DAI | $V_{temp}$ | | | |
|---|---|---|---|---|
| | 1(00) | 2(01) | 3(10) | 4(11) |
| Empty | 1 | 2 | 3 | 4 |

That is, when the bit size of the counter-DAI of DCI format 1_2 is less than 2 bits, there may be a plurality of possible 2-bit counter-DAI values. The UE may select one value from among a plurality of possible 2-bit counter-DAI values.

In order to select one of the plurality of candidate values, the following specific method may be used.

When the counter-DAI value of the PDCCH received immediately before is C and the currently received counter-DAI of DCI format 1_2 is interpreted as 2 bits, it is assumed that the possible 2-bit counter-DAI values are i1, i2, . . . . The UE needs to determine one value of the i1, i2, as the 2-bit counter-DAI value by using the $V_{temp}$ or C value.

The UE may calculate a value of Y based on Equation 2 below in the order of x=1, 2, 3.

$$Y=((V_{temp} \text{ or } C)+x-1 \text{ mod } 4)+1 \quad \text{[Equation 2]}$$

If Y is one value of i1, i2, . . . , the UE determines that the value of the 2-bit counter-DAI is Y This is a method for setting the 2-bit counter-DAI value to minimize the number of PDCCHs that have failed to be received since the immediately previously received PDCCH until the DCI format 1_2 currently received.

In Tables 4 and 5, $V_{temp}$ is a value (when the previously last received DCI format is DCI format 1_2, a value interpreted as the 2-bit counter-DAI value) of the counter-DAI with a 2-bit size immediately before (that is, the cell with a low cell index in the current monitoring occasion or the PDCCH last received in the previous monitoring occasion).

For example, when the value of $V_{temp}$ is 1 and the currently received counter-DAI of DCI format 1_2 is 0 in binary number, the counter-DAI may have a value of 1 or 3. When it is determined that the counter-DAI value is 3, it indicates a case where one PDCCH (the counter-DAI value is 2) has been transmitted between the previously received PDCCH (the counter-DAI value is 1) and the currently received PDCCH (the counter-DAI value is 3), but reception thereof has failed. When it is determined that the counter-DAI value is 1, it indicates a case where three PDCCHs (the counter-DAI values are 2, 3, and 4) have been transmitted between the previously received PDCCH (the counter-DAI value is 1) and the currently received PDCCH (the counter-DAI value is 1), but receptions thereof have failed. It is assumed that the smallest number of PDCCHs has been transmitted according to the previous embodiment but reception thereof has failed, and it may be determined that the value of the counter-DAI of the currently received PDCCH is 3.

In Proposals 1 and 2, only counter-DAI is used when generating the HARQ-ACK codebook, but the HARQ-ACK codebook may be generated by additionally using the total-DAI value. For example, in DCI format 1_2, total-DAI may be configured with the $N_{T-DAI}$ bits. In this case, similar to the method of Proposal 1, only the LSB (or MSB) $N_{T-DAI}$ bits in the two bit total-DAI field of DCI format 1_1 including the 2-bit total-DAI field are determined as valid bits, and the total-DAI value may be determined based on the valid $N_{T-DAI}$ bits.

In another embodiment of the present disclosure, a HARQ-ACK codebook may be generated by using a 2-bit total-DAI value. The Total-DAI value is determined according to the number of PDCCHs received up to the current monitoring occasion. If the number of PDCCHs received up to the current monitoring occasion is T, the total-DAI of the $N_{T-DAI}$ bit may be determined as $((T-1) \text{ mod } 2^{N_{T-DAI}})+1$. The PDCCH received in one monitoring occasion has the same 2-bit total-DAI value.

In another embodiment of the present disclosure, when at least one DCI format 1_1 is received in one monitoring occasion, a 2-bit total-DAI value included in DCI format 1_1 may be used. That is, when DCI format including the 2-bit total-DAI and DCI format including 1-bit total-DAI or 0-bit total-DAI are received in the same monitoring occasion, the 2-bit total-DAI contains the most information, and thus the 2-bit total-DAI value may be assumed.

In another embodiment of the present disclosure, when DCI format 1_1 is not received and DCI format 1_2 is received in one monitoring occasion, the value of 2-bit total-DAI may be determined as follows.

When the value of $N_{T\text{-}DAI}$, which is the bit size of total-DAI in DCI format 1_2, is 1 bit, it may be expanded and interpreted as a 2-bit total-DAI value. For example, when the bit of the 1-bit total-DAI is '0', the total-DAI value may be 1 or 3, and when the bit is '1', the total-DAI value may be 2 or 4.

When the value of $N_T$-DAI, which is the bit size of total-DAI in DCI format 1_2, is 0 bits (that is, when the total-DAI is not included in DCI format), the 0-bit total-DAI may be interpreted as a 2-bit total-DAI value.

For example, the value of 0 bit total-DAI may be 1, 2, 3 or 4. That is, when the bit size of the total-DAI of DCI format 1_2 is less than 2 bits, the 2-bit total-DAI may have a plurality of candidate values. In this case, one value may be selected from among the plurality of candidate values through the following method.

The value of the 2-bit counter-DAI of the PDCCH last received (that is, received from the cell with the highest cell index) in the current monitoring occasion may be C, and the value of the 2-bit total-DAI that the total-DAI included in the DCI on the PDCCH received in the corresponding monitoring occasion may have may be j1, j2, . . . .

In this case, the UE needs to determine one value of j1, j2, . . . , as the 2-bit total-DAI value by using the C value. The UE may calculate the value of Z based on Equation 3 below in turn according to the value of x (x=0, 1, 2, 3, . . . ).

$$Z = ((V_{temp} \text{ or } C) + x - 1 \mod 4) + 1 \quad \text{[Equation 3]}$$

If Z is one value of the values j1, j2, . . . , the UE determines that the value of the 2-bit total-DAI is Z. This is a method for setting the value of the 2-bit total-DAI to minimize the number of PDCCHs that have failed to be received for PDCCH that has been transmitted since the last PDCCH of the current monitoring occasion.

Table 9 below is a table showing an example of a total-DAI value selected from among a plurality of candidate values.

TABLE 9

| Total-DAI | $V_{temp2}$ | | | |
| --- | --- | --- | --- | --- |
|  | 1(00) | 2(01) | 3(10) | 4(11) |
| 1 or 3(0) | 1 | 3 | 3 | 1 |
| 2 or 4(1) | 2 | 2 | 4 | 4 |

In Table 9, $V_{temp2}$ is a value of the 2-bit counter-DAI of the last PDCCH among the PDCCHs received in the monitoring occasion. For example, when the value of the previous $V_{temp2}$ is 2 and the currently received counter-DAI of DCI format 1_2 is 0 in binary number, the total-DAI may have 1 or 3.

When it is determined that the total-DAI value is 3, it indicates a case where one PDCCH (the counter-DAI value is 3) has been transmitted since the last received PDCCH (the counter-DAI value is 2), but the UE does not detect it.

When it is determined that the total-DAI value is 1, it indicates a case where three PDCCHs (the counter-DAI values are 3, 4, and 1) have been transmitted since the last received PDCCH (the counter-DAI value is 2), but the UE does not detect them. It is assumed that the smallest number of PDCCHs has been transmitted according to the previous embodiment but receptions thereof have failed, and it may be determined that the value of the total-DAI of the received PDCCH is 3.

Through the method described above, the UE may determine the number of valid bits or extend and interpret the number of bits even when the number of bits of the counter-DAI or total-DAI of DCI having a different format is different, and multiplex the HARQ-ACK codebook for the PDSCHs scheduled by a plurality of pieces of DCI and transmit it to the base station.

Figure 16:
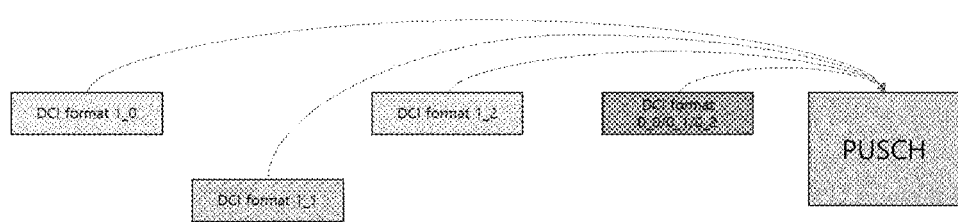
FIG. 16 illustrates an example of a method for transmitting a HARQ-Ack based on downlink control information for uplink and downlink scheduling according to an embodiment of the present disclosure.

FIG. 16 illustrates an example of a method for transmitting a HARQ-Ack based on downlink control information for uplink and downlink scheduling according to an embodiment of the present disclosure.

Referring to FIG. 16, the UE multiplexes the PUSCH scheduled through the DCI and the HARQ-ACK codebook including the HARQ-ACK bits of the PDSCH scheduled through the DCI on the PDCCH and transmits them to the base station.

Specifically, as illustrated in FIG. 16, the UE may multiplex (or piggyback) the HARQ-ACK bits of the received PDSCHs with the PUSCH and transmit them to the base station. In this case, the DCI formats for scheduling of PDSCHs are DCI format 10, DCI format 1_1, and/or DCI format 1_2. In addition, the DCI formats for scheduling of the PUSCH with which HARQ-ACK bits are multiplexed (or piggybacked) includes DCI format 0_0, DCI format 0_1, DCI format 0_2, and/or the like.

The length of the UL DAI field included in DCI format 0_2 may be set to be 0, 1, or 2 bits. Furthermore, the length of the counter-DAI field included in DCI format 1_2 may be set to be 0, 1, or 2 bits.

In addition, DCI format 0_0 and DCI format 0_1 may include a 2-bit UL DAI field, and DCI format 1_0 and DCI format 1_1 may include a 2-bit counter-DAI field.

In this case, when the length of the UL DAI field is not the same as the length of the counter-DAI field of DCI format 1_2, it is necessary to determine the value of the UL DAI field based on the counter-DAI field. Hereinafter, in the embodiment, it is assumed that the length of the DAI field is not at least 0. That is, the DCI format may include a DAI field having a length of at least 1 bit.

In a first embodiment, when the length of the UL DAI field is greater than the length of the counter-DAI field of DCI format 1_2 (e.g., when the length of the UL DAI field is 2 bits and the length of the counter-DAI field is 1 bit), the UE may determine only some of the bits of the UL DAI field as valid bits of the UL DAI field. Here, the number of some bits has the same number as that of bits of the counter-DAI field, and may be bits closest to the MSB or LSB of the UL DAI field.

The UE may calculate the UL DAI value by using bits determined as valid bits among the bits of the UL DAI field. If the UL DAI field has one valid bit, the UL DAI value is 1 when the bit is '0', and the UL DAI value is 2 when it is 1.

If the UL DAI field has two valid bits, the UL DAI value is 1 when the bits are '00', and the UL DAI value is 2 when they are 01. In addition, the UL DAI value is 3 when the 2 bits is 10, and the UL DAI value is 4 when the 2 bits are 11.

The UE may use the UL DAI value obtained using the bits of the UL DAI field determined as valid and the counter-DAI value obtained from the counter-DAI field to determine the number of HARQ-ACK bits for PDSCHs that have not been received.

For example, let the UL DAI value be X and the counter-DAI value be Y. If X=Y, it may be determined that there is no PDSCH that has not been received. However, when Y<X, it may be determined that X-Y PDSCHs have not been received, and when X<Y, it may be determined that T-(Y-X) PDSCHs have not been received. Here, $T=2^N$ and N is the number of bits of the counter-DAI field.

In a second embodiment, when the length of the UL DAI field is greater than the length of the counter-DAI field of DCI format 1_2 (e.g., the length of the UL DAI field is 2 bits and the length of the counter-DAI field is 1 bit), the UE may first determine the UL DAI value according to the length of the UL DAI field, and then modify the determined UL DAI value according to the counter-DAI field, thereby determining the final UL DAI value.

The process of first determining the value of the UL DAI according to the length of the UL DAI field is as follows. If the UL DAI field has a field length of 1 bit, the UL DAI value is 1 when the bit value is '0', and the UL DAI value is 2 when the bit value is '1'.

If the UL DAI field has a field length of 2 bits, the UL DAI value is 1 when the bit value is '00', and the UL DAI value is 2 when the bit value is '01'. In addition, the UL DAI value is 3 when the bit value is '10', and the UL DAI value is 4 when the bit value is '11'.

When the UL DAI value is determined according to the UL DAI field, the UE may modify the determined UL DAI value to match the counter-DAI field to determine the final UL DAI value as follows.

When $T=2^N$, where N is the number of bits of the counter-DAI field, and the determined value of the UL DAI is Z, the final UL DAI value (X) may be calculated using Equation 4 below.

$$\text{Final UL DAI value}(X) = ((Z-1) \mod T) + 1 \quad \text{[Equation 4]}$$

The UE may use the final UL DAI value X and the counter-DAI value obtained from the counter-DAI field to determine the number of HARQ-ACK bits for PDSCHs that have not been received. For example, when the counter-DAI value is Y, it may be determined that there is no PDSCH that has not been received when X=Y However, when Y<X, it may be determined that X-Y PDSCHs have not been received, and when X<Y, it may be determined that T-(Y-X) PDSCHs have not been received. Here, $T=2^N$ and N is the number of bits of the counter-DAI field.

In a third embodiment, when the length of the UL DAI field is greater than the length of the counter-DAI field of DCI format 1_2 (e.g., the length of the UL DAI field is 2 bits and the length of the counter-DAI field is 1 bit), the UE may assume (or recognize) that the range of the UL DAI values is the same as the range of the values that the counter-DAI may indicate. For example, when a value that may be indicated by the counter-DAI is 1, 2, 3, or 4, the value of the UL DAI may be recognized as one of 1, 2, 3, and 4.

Specifically, the UE may determine the value of the UL DAI according to the length of the UL DAI field. If the UL DAI field has a field length of 1 bit, the UL DAI value is 1 when the bit value is '0', and the UL DAI value is 2 when the bit value is '1'. If the UL DAI field has a field length of 2 bits, the UL DAI value is 1 when the bit value is '00', and the UL DAI value is 2 when the bit value is '01'. In addition, the UL DAI value is 3 when the bit value of the 2 bits is '10', and the UL DAI value is 4 when the bit value is '11'.

The UL DAI value always needs to be within the range of values that the counter-DAI may indicate. For example, when the UL DAI field has a length of 2 bits, the range of the UL DAI values is 1, 2, 3, and 4. If the counter-DAI value may have a range of 1 and 2, the length of the UL DAI field is 2 bits, but the values that the UL DAI may have are 1 and 2.

That is, the UE does not expect to be instructed with a UL DAI value indicating a value out of the range of values that the counter-DAI may have. It is not expected that 10 or 11, in which the value of the UL DAI indicates 3 or 4, is to be indicated. That is, when this value is indicated, the UE may determine an error case.

As described above, in DCI format 0_2, the length of the UL DAI field may be set to be 0, 1, or 2 bits. When the length of the UL DAI field is less than 2 bits, for the UL DAI, the 2-bit UL DAI value may be determined in the same way as the method for determining the 2-bit total-DAI value.

That is, the value of the UL DAI may be determined by using the last received 2-bit counter-DAI value. Table 10 below is a table showing an example of the 2-bit UL-DAI value.

TABLE 10

| | $V_{temp3}$ | | | |
|---|---|---|---|---|
| UL DAI | 1(00) | 2(01) | 3(10) | 4(11) |
| 1 or 3(0) | 1 | 3 | 3 | 1 |
| 2 or 4(1) | 2 | 2 | 4 | 4 |

In Table 10, $V_{temp3}$ is a 2-bit counter-DAI value of the last PDCCH among the received PDCCHs. For example, when the value of the previous $V_{temp3}$ is 2 and the bit value of the received UL-DAI of DCI format 0_2 is 0, the UL-DAI value may have 1 or 3.

When the UL-DAI value is determined as 3, it indicates a case where one PDCCH (the counter-DAI value is 3) has been transmitted since the last received PDCCH (the counter-DAI value is 2), but reception thereof has failed, and when the UL-DAI value is determined as 1, it indicates a case where three PDCCHs (the counter-DAI values are 3, 4, and 1) have been transmitted since the last received PDCCH (the counter-DAI value is 2), but receptions thereof have failed. As described above, when it is assumed that the smallest number of PDCCHs has been transmitted but receptions thereof has failed, the 2-bit UL-DAI value may be determined as 3.

FIG. 17(a) and FIG. 17(b) illustrate an example of a downlink assignment indicator of each piece of downlink control information detected in a monitoring occasion according to an embodiment of the present disclosure.

In another embodiment of the present disclosure, when the UE has a bit size of the UL DAI field of DCI format 00, 0_1, or 0_2 different from the bit size of the counter-DAI field of DCI format 1_0, 1_1, or DCI format 1_2, the UE may perform the following operations.

When the bit size of the counter-DAI field of DCI format 10, 1_1, or 1_2 is $N_{C\text{-}DAI}$ bits, the counter-DAI value may indicate $1, 2, \ldots, 2^{N_{C\text{-}DAI}}$. Here, when the largest value $C_D$ is $2^{N_{C\text{-}DAI}}$, that is, when the bit size $N_{C\text{-}DAI}$ of the counter-DAI field is 2 bits, the counter-DAI value may be 1 when the bit value of the counter-DAI field is '00', 2 when '01', 3 when '10', and 4 when '11'. In this case, the value of $C_D$ may be 4.

Alternatively, when $N_{C-DAI}$ is 1 bit, the counter-DAI value may be 1 when the value of the counter-DAI field is 0, and 2 when 1, where the value of $C_D$ is 2.

If the UE receives the DCI format for scheduling of the PDSCH in the serving cell c of the monitoring occasion m, and the counter-DAI value of the received DCI format is $V_{C-DAI,c,m}$, the UE may determine that $C_D*j+V_{C-DAI,c,m}$ DCI formats for scheduling of the PDSCH have been received up to the current serving cell c of the current monitoring occasion m where the DCI format has been received. Here, j is a non-negative integer.

In other words, when the number of DCI formats for scheduling of the PDSCH is X up to the current serving cell c of the current monitoring occasion m where the DCI format has been received, the counter-DAI value of the DCI format is $V_{C-DAI,c,m}=(X-1 \mod C_D)+1$.

When the bit size of the UL DAI field of DCI format 00, 01, or 0_2 is $N_{UL-DAI}$ bits, the UL DAI value may be expressed as 1, 2, ..., $2^{\wedge}N_{UL-DAI}$. Here, when the largest value $U_D$ is $2^{\wedge}N_{UL-DAI}$, that is, when the bit size $N_{UL-DAI}$ of the UL DAI field is 2 bits, the UL DAI value is 1 when the bit value of the UL DAI field is '00', 2 when '01', 3 when '10', and 4 when '11'. Further, the value of $U_D$ is 4.

If the UE receives the DCI format for scheduling of the PUSCH in the monitoring occasion m, and the UL-DAI value of the received DCI format is $V_{UL-DAI,m}$, the UE may determine that $U_D*i+V_{UL-DAI,m}$ DCI formats for scheduling of the PDSCH up to the current monitoring occasion m receiving the DCI format have been received. Here, i is a non-negative integer.

In other words, when the number of DCI formats for scheduling of the PDSCH is X up to the current monitoring occasion m where the DCI format has been received, the UL-DAI value of the DCI format is $V_{UL-DAI,m}=(X-1 \mod U_D)+1$.

For example, when the value of $U_D$ is 4 and the value of $C_D$ is 2, the counter-DAI value may be 1 or 2, and the UL-DAI value may be 1, 2, 3, or 4. (a) of FIG. 17 illustrates an example of counter-DAI values of DCI formats received in monitoring occasions (MO) #0 to #6.

According to the definition of the counter-DAI value, the counter-DAI value of DCI format received on MO #0 is 1, the counter-DAI value of DCI format received on MO #1 is 2, the counter-DAI value of the DCI format received on MO #2 is 1, the counter-DAI value of the DCI format received on MO #3 is 2, the counter-DAI value of the DCI format received on MO #4 is 1, the counter-DAI value of the DCI format received on MO #5 is 2, and the counter-DAI value of the DCI format received on MO #6 is 1. Furthermore, the UE receives the DCI format for scheduling of the PUSCH. The UL DAI value of the received DCI format is 3. This is because seven DCI formats for scheduling of the PDSCH have been previously received.

In the present disclosure, when the bit size of the counter-DAI and the bit size of the UL DAI are different from each other, a method for generating a HARQ-ACK codebook by the UE is presented. It is assumed that the UE has not received the DCI format of MO #4 and MO #5 in (b) of FIG. 17. Since the UE has received the DCI format in which the counter-DAI value is 2 on MO #3 and the DCI format in which the counter-DAI value is 1 on MO #6, the UE may not know the reception failure of the DCI format on MO #4 and MO #5. Therefore, the UE generates only HARQ-ACK bits for DCI formats received on MO #0, MO #1, MO #2, MO #3, and MO #6 and includes them in the HARQ-ACK codebook.

If the UE receives 3 as the UL-DAI value in the DCI format for scheduling of the PUSCH, the UE may recognize that there are two more DCI formats in addition to the five DCI formats that have been successfully received. Accordingly, the UE may generate HARQ-ACK bits of a total of seven DCI formats and include them in the HARQ-ACK codebook.

FIG. 19(a) and FIG. 19(b) illustrate an example of a method for transmitting a HARQ-ACK based on downlink control information having a different format based on a pseudo code according to an embodiment of the present disclosure.

Referring to FIG. 19(a) and FIG. 19(b), a HARQ-ACK codebook may be generated by using a UL-DAI value and a counter-DAI value using a pseudo code and transmitted to the base station. FIG. 19(a) and FIG. 19(b) illustrate an example of multiplexing a 2-bit UL-DAI and a 1-bit counter-DAI.

Specifically, in an embodiment of the present disclosure, the UL-DAI value and the counter-DAI value may be used as follows. First, as illustrated in (a) of FIG. 19, let the counter-DAI value received by the UE at the last MO be $V_{temp}$. As mentioned earlier, the counter-DAI value may have one of 1, 2, ..., $C_D$. Let the UL DAI value received by the UE in the DCI format for scheduling of the PUSCH be $V_{temp2}$. The UE generates the HARQ-ACK codebook through the following process.

First, the UE may determine the number of DCI formats $W_{temp}$ for scheduling of the PDSCH with $V_{temp}$. $W_{temp}$ may be determined by Equation 5 below.

$$W_{temp}=C_D*j+V_{temp} \qquad \text{[Equation 5]}$$

In Equation 5, the initial value of j is set to 0, and when the counter-DAI value of the DCI format for scheduling of the PDSCH on the current MO is smaller than the counter-DAI value of the DCI format for scheduling of the PDSCH on the previous MO, it may be incremented by one. That is, DCI formats having the counter-DAI values of 1, 2, ..., $C_D$ are grouped into one group, and j indicates how many groups have been received. In (b) of FIG. 17, j=2.

Then, the UE converts the number $W_{temp}$ of the DCI formats for scheduling the PDSCH into $V'_{temp}$, which is a counter-DAI value corresponding to $N_{UL-DAI}$, which is the bit size of the UL DAI field, as illustrated in (b) of FIG. 19. In this case, $V'_{temp}$ may be determined by Equation 6 below.

$$V'_{temp}=((W_{temp}-1) \mod U_D)+1 \qquad \text{[Equation 6]}$$

In Equation 6, $V'_{temp}$ has one of 1, 2, $U_D$ like the UL DAI. The UE may determine the value of j by comparing $V'_{temp}$ and $V_{temp2}$. If $V_{temp2}<V'_{temp}$, the value of j may be determined through Equation 7 below.

$$j = j + \frac{U_D}{C_D} \qquad \text{[Equation 7]}$$

Otherwise, j may remain as it is. Using the value of j, the UE may determine the size $O^{ACK}$ of the HARQ-ACK codebook. If the UE is configured to receive only 1 TB per PDSCH, $O^{ACK}$ may be calculated through Equation 8 below.

$$O^{ACK} = U_D \cdot \text{floor}\left(j \cdot \frac{C_D}{U_D}\right) + V_{temp2} \qquad \text{[Equation 8]}$$

If the UE is configured to receive 2 TB per PDSCH, $O^{ACK}$ may be calculated through Equation 9 below.

$$O^{ACK} = 2\left(U_D \cdot \text{floor}\left(j \cdot \frac{C_D}{U_D}\right) + V_{temp2}\right) \qquad \text{[Equation 9]}$$

When this is expressed in a pseudo code, it is shown as in Table 11 below.

TABLE 11

If the UE transmits HARQ-ACK information in a PUCCH in slot n and for any PUCCH format, the UE determines the $\tilde{o}_0^{ACK}, \tilde{o}_1^{ACK}, \ldots, \tilde{o}_{O^{ACK}-1}^{ACK}$, for a total number of $O_{ACK}$ HARQ-ACK information bits. according to the following pseudo-code:

Set m=0 − PDCCH with DCI format scheduling PDSCH reception or SPS PDSCH release monitoring occasion index: lower index corresponds to earlier PDCCH monitoring occasion
    Set j=0
    Set $V_{temp}$=0
    Set $V_{temp2}$=0
    Set $V_s$ is an empty set
    Set $N_{cells}$ to the number of serving cells configured by higher layers for the UE
    Set M to the number of PDCCH monitoring occasion(s)
    While m<M
        Set c=0-serving cell index: lower indexes correspond to lower RRC indexes of corresponding cell
        while c<$N_{cells}$
            if PDCCH monitoring occasion m is before an active DL BWP change on serving cell c or an active UL BWP change on the PCell and an active DL BWP change is not triggered in PDCCH monitoring occasion m
                c=c+1;
            else
                if there is a PDSCH on serving cell c associated with PDCCH in PDCCH monitoring occasion m, or there is a PDCCH indicating SPS PDSCH release on serving cell c
                    if $V_{C-DAI,c,m}$ is less than or equal to $V_{temp}$
                        j=j+1
                    end if
                    $V_{temp} = V_{C-DAI,c,m}$
                    if $V_{T-DAI,m}$ is empty
                        $V_{temp2} = V_{C-DAI,c,m}$
                    else
                        $V_{temp2} = V_{T-DAI,m}$
                    end if
                    if harq-ACK-SpatialBundlingPUCCH is not provided and the UE is configured by maxNrofCodeWordsScheduledByDCI with reception of two transport blocks for at least one configured DL BWP of at least one serving cell,
                        $\tilde{o}_{2\cdot C_D\cdot j+2(V_{C-DAI,c,m}^{DL}-1)}^{ACK}$ = HARQ-ACK information bit corresponding to the first transport block of this cell
                        $\tilde{o}_{2\cdot C_D\cdot j+2(V_{C-DAI,c,m}^{DL}-1)+1}^{ACK}$ = HARQ-ACK information bit corresponding to the second transport block of this cell
$V_S = V_S \cup \{2 \cdot C_D \cdot j + 2(V_{C-DAI,c,m}^{DL} - 1), 2 \cdot C_D \cdot j + 2(V_{C-DAI,c,m}^{DL} - 1) + 1\}$
                    elseif harq-ACK-SpatialBundlingPUCCH is provided to the UE and m is a monitoring occasion for PDCCH with a DCI format that supports PDSCH reception with two transport blocks and the UE is configured by maxNrofCodeWordsScheduledByDCI with reception of two transport blocks in at least one configured DL BWP of a serving cell,
                        $\tilde{o}_{C_D\cdot j+V_{C-DAI,c,m}^{DL}-1}^{ACK}$ = binary AND operation of the HARQ-ACK information bits corresponding to the first and second transport blocks of this cell
$V_s = V_s \cup \{C_D \cdot j + V_{C-DAI,c,m}^{DL} - 1\}$
                    else
                        $\tilde{o}_{C_D\cdot j+V_{C-DAI,c,m}^{DL}-1}^{ACK}$ = HARQ-ACK information bit of this cell
$V_s = V_s \cup \{C_D \cdot j + V_{C-DAI,c,m}^{DL} - 1\}$
                    end if
                end if
                c=c+1
            end if
        end while
        m=m+1
    end while
    if $V_{temp2} < ((C_D \cdot V_{temp} -1) \mod U_D) + 1$ or $V_{temp} = 0$ $$j = j + \frac{U_D}{C_D}$$

end if
if harq-ACK-SpatialBundlingPUCCH is not provided to the UE and the UE is configured by maxNrofCodeWordsScheduledByDCI with reception of two transport blocks for at least one configured
    L BWP of a serving cell, $$O^{ACK} = 2 \cdot \left( U_D \cdot \text{floor}\left( j \cdot \frac{C_D}{U_D} \right) + V_{temp2} \right)$$

else $$O^{ACK} = 2 \cdot \left( U_D \cdot \text{floor}\left( j \cdot \frac{C_D}{U_D} \right) + V_{temp2} \right)$$

end if
$\tilde{o}_i^{ACK}$ = NACK for any $i \in \{0, 1, \ldots, O^{ACK} - 1\} \setminus V_s$
Set c=0
while c<$N_{cells}$
    if a single SPS PDSCH reception is activated for a UE and the UE is configured to receive SPS PDSCH in a slot n-$K_{1,c}$ for serving cell c, where $K_{1,c}$ is the PDSCH-to-HARQ-feedback timing TABLE 11-continued

```
        value for SPS PDSCH on serving cell c
            O^ACK = O^ACK + 1
            O_O^ACK_1^ACK = HARQ-ACK information bit associated with the SPS PDSCH reception
        end if
        c=c+1;
end while
```

FIG. 18(a) and FIG. 18(b) illustrate another example of a downlink assignment indicator of each piece of downlink control information detected in a monitoring occasion according to an embodiment of the present disclosure.

In another embodiment of the present disclosure, when the UE has a bit size of the total-DAI field of DCI format 1_0, 1_1, or 1_2 different from the bit size of the counter-DAI field of DCI format 1_0, 1_1, or DCI format 1_2, the UE may generate the HARQ-ACK codebook through the following operations.

When the bit size of the counter-DAI field of DCI format 1_0, 1_1, or 1_2 is $N_C$-DAI bits, the counter-DAI value may indicate 1, 2, ..., $2^{N_{C-DAI}}$. Here, when the largest value $C_D$ is $2^{N_C}$-DAI, that is, when the bit size $N_{C-DAI}$ of the counter-DAI field is 2 bits, the counter-DAI value may be 1 when the bit value of the counter-DAI field is '00', 2 when '01', 3 when '10', and 4 when '11'. In this case, the value of $C_D$ may be 4.

Alternatively, when $N_{C-DAI}$ is 1 bit, the counter-DAI value may be 1 when the value of the counter-DAI field is 0, and 2 when 1, where the value of $C_D$ is 2.

If the UE receives the DCI format for scheduling of the PDSCH in the serving cell c of the monitoring occasion m, and the counter-DAI value of the received DCI format is $V_{C-DAI,c,m}$, the UE may determine that $C_D*j+V_{C-DAI,c,m}$ DCI formats for scheduling of the PDSCH have been received up to the current serving cell c of the current monitoring occasion m where the DCI format has been received. Here, j is a non-negative integer.

In other words, when the number of DCI formats for scheduling of the PDSCH is X up to the current serving cell c of the current monitoring occasion m where the DCI format has been received, the counter-DAI value of the DCI format is $V_{C-DAI,c,m}=(X-1 \mod C_D)+1$.

When the bit size of the total-DAI field of DCI format 1_0, 1_1, or 1_2 is $N_{T-DAI}$ bits, the total-DAI value may indicate 1, 2, ..., $2^{N_{T-DAI}}$. Here, when the largest value $T_D$ is $2^{N_{T-DAI}}$, that is, when the bit size $N_{T-DAI}$ of the total-DAI field is 2 bits, the total-DAI value is 1 when the bit value of the total-DAI field is '00', 2 when '01', 3 when '10', and 4 when '11'. Further, the value of $T_D$ is 4.

If the UE receives the DCI format for scheduling of the PDSCH in the monitoring occasion m, and the total-DAI value of the DCI format is $V_{T-DAI,m}$, the UE may determine that $T_D*i+V_{T-DAI,m}$ DCI formats for scheduling of the PDSCH up to the current monitoring occasion m receiving the DCI format have been received. Here, i is a non-negative integer.

In other words, when the number of DCI formats for scheduling of the PDSCH is X up to the current monitoring occasion m where the DCI format has been received, the total-DAI value $V_{T-DAI,c,m}$ of the DCI format is $(X-1 \mod T_D)+1$.

Let's look at a case where the value of $T_D$ is 4 and the value of $C_D$ is 2 as an example. A value of 1 or 2 may be set as the counter-DAI value of the UE, and the total-DAI may have a value of 1, 2, 3, or 4.

(a) of FIG. 18 illustrates (counter-DAI, total-DAI) values of DCI format received on MOs #0 to #6. According to the definition of the counter-DAI value and the total-DAI value, (counter-DAI, total-DAI) of DCI format received on MO #0 is (1, 1), (counter-DAI, total-DAI) of DCI format received on MO #1 is (2, 2), (counter-DAI, total-DAI) of the DCI format received on MO #2 is (1, 3), (counter-DAI, total-DAI) of the DCI format received on MO #3 is (2, 4), (counter-DAI, total-DAI) of the DCI format received on MO #4 is (1, 1), (counter-DAI, total-DAI) of the DCI format received on MO #5 is (2, 2), and (counter-DAI, total-DAI) of the DCI format received on MO #6 is (1, 3).

As another example of the present disclosure, when the bit size of the counter-DAI and the bit size of the total-DAI are different from each other, a method for generating a HARQ-ACK codebook by the UE is presented. As illustrated in (b) of FIG. 18, the UE may not receive DCI formats of MO #4 and MO #5. In this case, the UE has received the DCI format in which the counter-DAI value is 2 on MO #3 and the DCI format in which the counter-DAI value is 1 on MO #6, and thus the UE may not recognize the reception failure of the DCI format on MO #4 and MO #5.

Therefore, the UE generates only HARQ-ACK bits for DCI formats received on MO #0, MO #1, MO #2, MO #3, and MO #6 and includes them in the HARQ-ACK codebook.

If the UE receives 3 as the total-DAI value in the DCI format for scheduling of the PDSCH, the UE may determine that there are two more DCI formats in addition to the five DCI formats that have been successfully received. Accordingly, the UE may generate HARQ-ACK bits of a total of seven DCI formats and include them in the HARQ-ACK codebook.

Specifically, in an embodiment of the present disclosure, the total-DAI value and the counter-DAI value may be used as follows. First, the value of counter-DAI received by the UE on the last MO may be $V_{temp}$. As described above, the counter-DAI value may have one of 1, 2, ..., $C_D$. When the value of total-DAI received by the UE in the DCI format for scheduling of the PDSCH is $V_{temp2}$, the UE may generate the HARQ-ACK codebook through the following process.

First, the UE may determine $W_{temp}$, which is the number of DCI formats for scheduling of the PDSCH with $V_{temp}$, through Equation 10 below.

$$W_{temp} = C_D*j + V_{temp} \qquad [\text{Equation 10}]$$

In Equation 10, the initial value of j may be set to 0, and when the counter-DAI value of the DCI format for scheduling of the PDSCH on the current MO is smaller than the counter-DAI value of the DCI format for scheduling of the PDSCH on the previous MO, it may be incremented by one.

That is, DCI formats having the counter-DAI values of 1, 2, ..., $C_D$ are grouped into one group, and j indicates how many grouped groups have been received. In (a) of FIG. 18, j=2.

Next, the UE converts the number $W_{temp}$ of the DCI format for scheduling of the PDSCH into $V'_{temp}$, which is a counter-DAI value corresponding to $N_{T-DAI}$, which is the bit size of the total-DAI field. This may be performed by Equation 11 below.

$$V'_{temp} = ((W_{temp}-1) \bmod T_D) + 1 \quad \text{[Equation 11]}$$

In Equation 11, $V'_{temp}$ has one of 1, 2, ..., $T_D$, like the total-DAI. The UE may determine the value of j by comparing the $V'_{temp}$ and $V_{temp2}$. If $V_{temp2} < V'_{temp}$, the value of j may be calculated through Equation 12 below.

$$j = j + \frac{T_D}{C_D} \quad \text{[Equation 12]}$$

Otherwise, j may remain as it is. Using the value of j, the UE may determine the size $O^{ACK}$ of the HARQ-ACK codebook. If the UE is configured to receive only 1 TB per PDSCH, $O^{ACK}$ may be calculated through Equation 13 below.

$$O^{ACK} = U_D \cdot \text{floor}\left(j \cdot \frac{C_D}{T_D}\right) + V_{temp2} \quad \text{[Equation 13]}$$

If the UE is configured to receive 2 TB per PDSCH, $O^{ACK}$ may be calculated through Equation 14 below.

$$O^{ACK} = 2\left(U_D \cdot \text{floor}\left(j \cdot \frac{C_D}{T_D}\right) + V_{temp2}\right) \quad \text{[Equation 14]}$$

In another embodiment of the present disclosure, when the bit sizes of the counter-DAI fields of DCI format 1_0, 1_1, or 1_2 are different from each other, the UE may perform the following operations.

The bit size of the counter-DAI field of the DCI format 1_0, 1_1, or 1_2 received in the serving cell c in the monitoring occasion m may be $N_{C-DAI,c,m}$ bits. In this case, the counter-DAI value may be expressed as 1, 2, ..., $2^{N_{C-DAI,c,m}}$. Here, the largest value $C_{D,c,m}$ may be $2^{N_{C-DAI,c,m}}$. That is, when the bit size $N_{C-DAI,c,m}$ of the counter-DAI field is 2 bits, the counter-DAI value is 1 when the bit value of the counter-DAI field is '00', 2 when '01', 3 when '10', and 4 when '11'. Furthermore, the value of $C_D$ is 4. When $N_{C-DAI,c,m}$ is 1 bit, the counter-DAI value is 1 when the bit value of the counter-DAI field is 0, and 2 when 1. Furthermore, the value of $C_{D,c,m}$ is 2.

If the UE receives the DCI format for scheduling of the PDSCH in the serving cell c of the monitoring occasion m, and the counter-DAI value of the received DCI format is $V_{C-DAI,c,m}$, the UE may determine that $C_{D,c,m}*j + V_{C-DAI,c,m}$ DCI formats for scheduling of the PDSCH have been received up to the current serving cell c of the current monitoring occasion m where the DCI format has been received. Here, j is a non-negative integer.

In other words, when the number of DCI formats for scheduling of the PDSCH is X up to the current serving cell c of the current monitoring occasion m where the DCI format has been received, the counter-DAI value $V_{C-DAI,c,m}$ of the DCI format is (X–1 mod $C_{D,c,m}$)+1.

In the present disclosure, when the bit sizes of the counter-DAIs are different from each other, a method for generating a HARQ-ACK codebook by the UE is presented. In an embodiment of the present disclosure, the counter-DAI value is used as follows.

$N_{C-DAI}$,min is assumed to be the minimum bit size among the bit sizes of the counter-DAI fields of the DCI formats, and the value of $C_{D,min}$ may be $2^{(N_{C-DAI,min})}$. For example, when the bit size of the counter-DAI field of one DCI format is 2 bits and the bit size of the counter-DAI field of another DCI format is 1 bit, the value of $N_{C-DAI}$,min is 1 and the value of $C_{D,min}$ is 2.

When the value of counter-DAI received in serving cell c of the monitoring occasion m is $V_{C-DAI,c,m}$, the value of counter-DAI may have one of is 1, 2, ..., $C_{D,c,m}$, as described above. First, the UE may determine the number $S_{c,m}$ of the DCI format for scheduling of the PDSCH with $V_{C-DAI,c,m}$ based on Equation 15 below.

$$S_{c,m} = \text{floor}\left(j * \frac{C_{D,min}}{C_{D,c,m}}\right) * C_{D,c,m} + V_{C-DAI,c,m} \quad \text{[Equation 15]}$$

In Equation 15, the part of floor($j*C_{D,min}/C_{D,c,m}$)*$C_{D,c,m}$ is a part for letting the number $S_{c,m}$ of DCI formats for scheduling of the PDSCH satisfy ($S_{c,m}$-1 mod $C_{D,c,m}$)+1=$V_{C-DAI,c,m}$.

That is, the value of j may be adjusted through scaling and/or flooring so that the value of $S_{c,m} - V_{C-DAI,c,m}$ is a multiple of $C_{D,c,m}$ in Equation 15.

The UE compares the number $S_{c,m}$ of DCI formats obtained based on the counter-DAI values received in the serving cell c in the current monitoring occasion m with the number $W_{temp}$ of DCI formats obtained immediately before. If $S_{c,m} \leq W_{temp}$ is satisfied, the value of j may be incremented until $S_{c,m} > W_{temp}$. In this case, the value of j may be incremented by one. If $S_{c,m} > W_{temp}$, j may remain as it is.

j is a parameter indicating how many $C_{D,min}$ DCI formats have been received.

When this is expressed in a pseudo-code, it is shown in Table 12 below.

TABLE 12

Denote by $N_{C-DAI,c,m}$ the number of bits for the counter DAI in a DCI format detected in monitoring occasion m in a serving cell c and set $C_{D,c,m} = 2^{N_{C-DAI,c,m}}$.
Denote by $N_{C-DAI,min}$ the minimum number of bits for the counter DAI in a DCI formats and set $C_{D,c,m} = 2^{N_{C-DAI,min}}$.
Denote by $N_{T-DAI,m}$ the number of bits for the total DAI in a DCI format detected in monitoring occasion m and set $T_{D,m} = 2^{N_{T-DAI,m}}$.
Denote by $N_{UL-DAI}$ the number of bits for the UL DAI in a DCI format scheduling a PUSCH transmission and set $U_{D,m} = 2^{N_{UL-DAI}}$.
If the UE transmits HARQ-ACK information in a PUCCH in slot n and for any PUCCH format, the UE determines the $\tilde{o}_0^{ACK}, \tilde{o}_1^{ACK}, \ldots, \tilde{o}_{O_{ACK}-1}^{ACK}$, for a total number of $O_{ACK}$ HARQ-ACK information bits, according to the following pseudo-code:
    Set m=0-PDCCH with DCI format scheduling PDSCH reception or SPS PDSCH release monitoring
       occasion index: lower index corresponds to earlier PDCCH monitoring occasion
    Set j=0
    Set $V_{temp}=0$, $W_{temp}=0$ TABLE 12-continued Set $V_{temp2}=0$
Set $V_s$ as an empty set
Set $N_{cells}$ to the number of serving cells configured by higher layers for the UE
Set M to the number of PDCCH monitoring occasion(s)
While m<M
    Set c=0-serving cell index: lower indexes correspond to lower RRC indexes of corresponding cell
    while c<$N_{cells}$
        if PDCCH monitoring occasion m is before an active DL BWP change on serving cell c or an
        active UL BWP change on the PCell and an active DL BWP change is not triggered in PDCCH
        monitoring occasion m
          c=c+1;
        else
          if there is a PDSCH on serving cell c associated with PDCCH in PDCCH monitoring occasion
          m, or there is a PDCCH indicating SPS PDSCH release on serving cell c $$S_{c,m} = \text{floor}\left(j * \frac{c_{D,min}}{c_{D,c,m}}\right) * C_{D,c,m} + V_{C-DAI,c,m}$$

while $S_{c,m} \leq W_{temp}$
            j = j + 1

$$S_{c,m} = \text{floor}\left(j * \frac{c_{D,min}}{c_{D,c,m}}\right) * C_{D,c,m} + V_{C-DAI,c,m}$$

end while
          $W_{temp} = S_{c,m}$
          if $V_{T-DAI,m}$ is empty
            $V_{temp2} = V_{C-DAI,c,m}$
          else
            $V_{temp2} = V_{T-DAI,m}$
          end if
          if harq-ACK-SpatialBundlingPUCCH is not provided and the UE is configured by
          maxNrofCodeWordsScheduledByDCI with reception of two transport blocks for at least
          one configured DL BWP of at least one serving cell,
            $\tilde{o}_{2(W_{temp}-1)}^{ACK}$ = HARQ-ACK information bit corresponding to the first transport block
              of this cell
            $\tilde{o}_{2(W_{temp}-1)+1}^{ACK}$ = HARQ-ACK information bit corresponding to the second transport
              block of this cell
$V_s = V_s \cup \{2(W_{temp} - 1), 2(W_{temp} - 1) + 1\}$
          elseif harq-ACK-SpatialBundlingPUCCH is provided to the UE and m is a monitoring
          occasion for PDCCH with a DCI format that supports PDSCH reception with two transport
          blocks and the UE is configured by maxNrofCodeWordsScheduledByDCI with reception
          of two transport blocks in at least one configured DL BWP of a serving cell,
            $\tilde{o}_{W_{temp}-1}^{ACK}$ = binary AND operation of the HARQ-ACK information bits corresponding
              to the first and second transport blocks of this cell
$V_s = V_s \cup \{W_{temp} - 1\}$
          else
            $\tilde{o}_{W_{temp}-1}^{ACK}$ = HARQ-ACK information bit of this cell
$V_s = V_s \cup \{W_{temp} - 1\}$
          end if
        end if
        c=c+1
        end if
    end while
    m=m+1
end while
if $V_{temp2} < ((W_{temp} - 1) \mod T_D) + 1$ or $V_{temp} = 0$ $$j = j + \frac{T_D}{c_{D,min}}$$

end if
if harq-ACK-SpatialBundlingPUCCH is not provided to the UE and the UE is configured by
maxNrofCodeWordsScheduledByDCI with reception of two transport blocks for at least one configured
DL BWP of a serving cell, $$O^{ACK} = 2 \cdot \left(T_D \cdot \text{floor}\left(j \cdot \frac{C_{D,min}}{U_D}\right) + V_{temp2}\right)$$

else $$O^{ACK} = T_D \cdot \text{floor}\left(j \cdot \frac{C_{D,min}}{U_D}\right) + V_{temp2}$$

end if
$\tilde{o}_i^{ACK}$ = NACK for any $i \in \{0, 1, \ldots, O^{ACK} - 1\} \backslash V_s$ In Table 12, when the HARQ-ACK codebook is multiplexed with the PUSCH, $T_D=U_D$, and $V_{temp2}$ after the while statement may be set to the value of UL DAI.

DCI format 1_2 may not include counter-DAI (this includes being configured with 0 bits). In this case, the UE may be ambiguous about a method for determining the dynamic HARQ-ACK codebook. That is, in designing the dynamic HARQ-ACK codebook (type-2 HARQ-ACK codebook), the base station may be configured to omit some of the DCI field in order to increase the PDCCH reception success probability of the UE. That is, the base station may omit some of the DCI field or set the field size to 0 bits.

For example, the base station may omit the counter-DAI field from among DCI fields to be transmitted to the UE, or set the size of the field to 0 bits.

As described above, in the dynamic HARQ-ACK codebook, the counter-DAI field may be used not only to determine the position of the HARQ-ACK bit in the HARQ-ACK codebook, but also to determine the size of the HARQ-ACK codebook.

In order for the UE to transmit HARQ-ACK bits for notifying the base station of ACK/NACK (or DTX) for a plurality of PDSCHs with the HARQ-ACK codebook, the values of the counter-DAI fields of DCI need to be arranged in ascending order, but when the counter-DAI field is omitted, values of the counter-DAI fields may not be sorted in ascending order through explicit values, and thus a method for determining the order of HARQ-ACK bits in the HARQ-ACK codebook is required.

Therefore, a method for generating a HARQ-ACK codebook according to a predetermined criterion even when some fields of DCI are omitted will be described.

FIG. 20(a) and FIG. 20(b) illustrate an example of a method for transmitting a HARQ-ACK for a PDSCH according to a reception order of a PDCCH according to an embodiment of the present disclosure.

Referring to FIG. 20(a) and FIG. 20(b), when some of the DAI field is omitted or the size is set to 0 bits, the UE may generate the HARQ-ACK codebook according to the order in which the PDCCHs for scheduling PDSCHs are received, not the counter-DAI values.

In the first embodiment of the present disclosure, the UE may determine the order of HARQ-ACK bits for the PDSCHs in the HARQ-ACK codebook based on time information at which the PDCCH for scheduling of the PDSCH is received. That is, the UE may determine the order of HARQ-ACK bits included in the HARQ-ACK codebook according to the order in which the PDCCHs are received, regardless of the value of the counter-DAI in the PDCCH transmitted to schedule the PDSCH.

Figure 20:
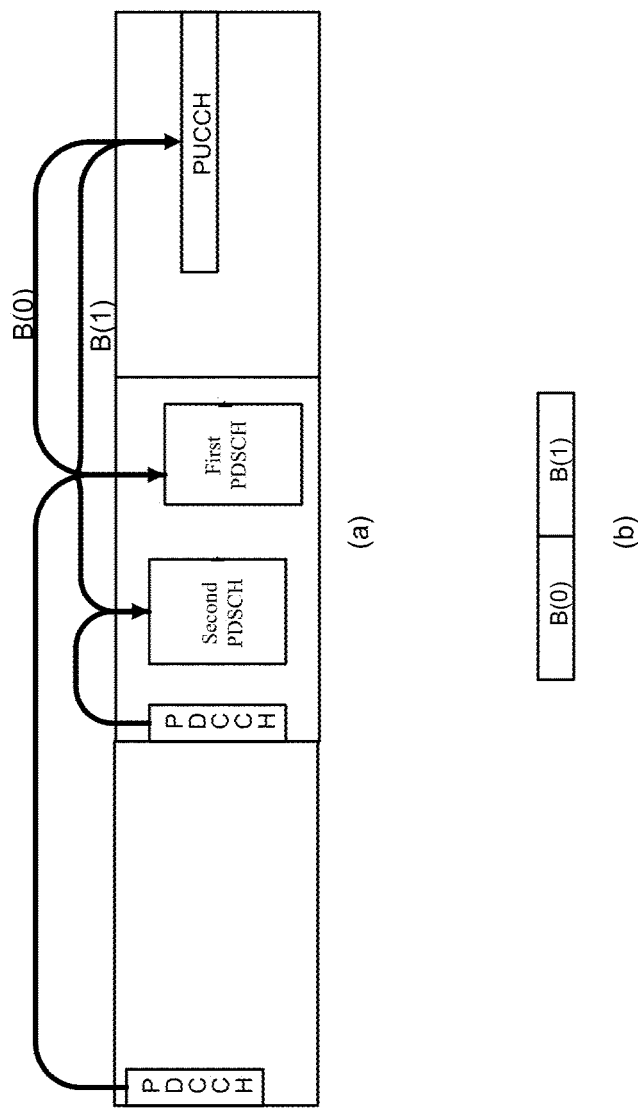
FIG. 20 illustrates an example of a method for transmitting a HARQ-ACK for a PDSCH according to a reception order of a PDCCH according to an embodiment of the present disclosure.

For example, when a starting symbol of a CORESET including the PDCCH for scheduling the first PDSCH or its search space is positioned before a starting symbol of a CORESET including the PDCCH for scheduling the second PDSCH or its search space as illustrated in (a) of FIG. 20, in the HARQ-ACK codebook, B(1), which is the HARQ-ACK bit of the first PDSCH may be disposed at a position before B(0), which is the HARQ-ACK bit of the second PDSCH, as illustrated in (b) of FIG. 20. If the starting symbols of the CORESETs or search spaces are the same as each other, the HARQ-ACK bit of the PDSCH scheduled by the PDCCH for which the last symbol of the CORESET or its search space precedes may be disposed at a preceding position.

FIG. 21(a) and FIG. 21(b) illustrate an example of a method for transmitting a HARQ-ACK for a PDSCH according to time information about a PDSCH according to an embodiment of the present disclosure.

Referring to FIG. 21(a) and FIG. 21(b), when some of the DAI field is omitted or the size is set to 0 bits, the UE may generate the HARQ-ACK codebook according to time information about the PDSCH included in the PDCCH for scheduling the PDSCH, not the counter-DAI values.

In the second embodiment of the present disclosure, the UE may determine the order of the HARQ-ACK bits of PDSCHs constituting the HARQ-ACK codebook according to the time information about the PDSCHs. Specifically, when a starting symbol of the first PDSCH is positioned before a starting symbol of the second PDSCH, in the HARQ-ACK codebook, the position of the HARQ-ACK bit for the first PDSCH may precede the position of the HARQ-ACK for the second PDSCH.

Figure 21:
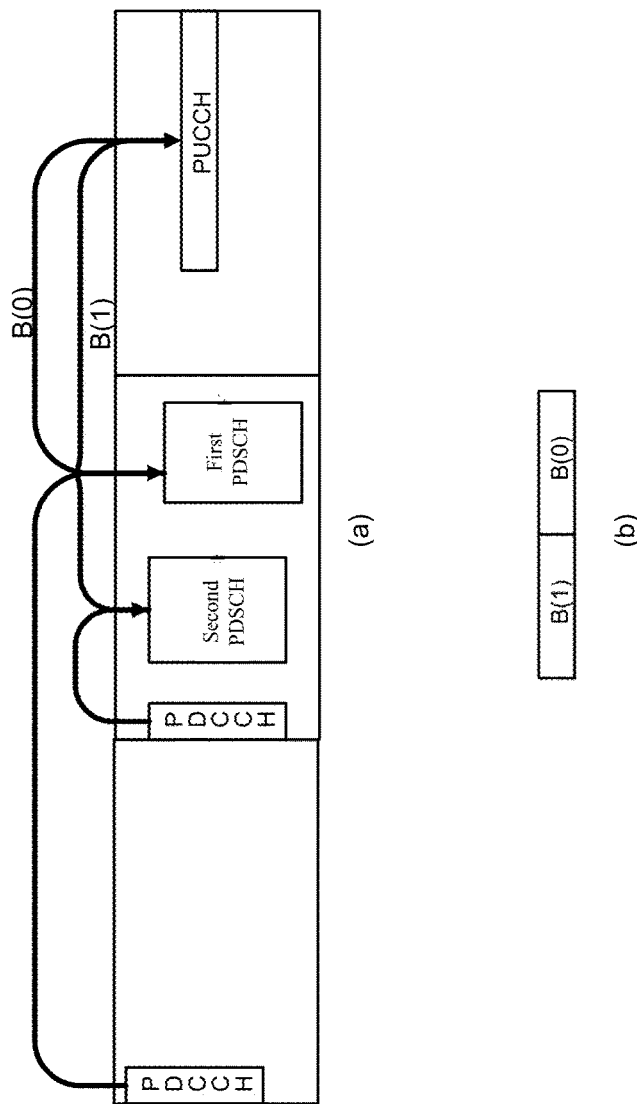
FIG. 21 illustrates an example of a method for transmitting a HARQ-ACK for a PDSCH according to time information about a PDSCH according to an embodiment of the present disclosure.

For example, as illustrated in (a) of FIG. 21, the starting symbol of the second PDSCH may be positioned before the starting symbol of the first PDSCH, based on time information included in the PDCCH for scheduling of the first PDSCH and the time information included in the PDCCH for scheduling the second PDSCH. In this case, as illustrated in (b) of FIG. 21, in the UE transmitting the HARQ-ACK for the first PDSCH and the HARQ-ACK for the second PDSCH through the PUCCH, B(1), which is the HARQ-ACK bit for the second PDSCH, may be positioned before B(0), which is the HARQ-ACK bit for the first PDSCH.

FIG. 22(a) and FIG. 22(b) illustrate an example of a method of transmitting a HARQ-ACK for a PDSCH according to a HARQ process ID (or HARQ process number) of a PDCCH for scheduling the PDSCH according to an embodiment of the present disclosure.

Referring to FIG. 22(a) and FIG. 22(b), when some of the DAI field is omitted or the size is set to 0 bits, the UE may generate the HARQ-ACK codebook according to the HARQ process ID (or HARQ process number) included in the PDCCH for scheduling the PDSCH, not the counter-DAI values.

In the third embodiment of the present disclosure, the UE may determine the order of the HARQ-ACK bits in the HARQ-ACK codebook according to the value of the HARQ process ID (or HARQ process number) of the PDCCH for scheduling the PDSCH.

Specifically, when the HARQ process ID of the first PDSCH in the PDCCH for scheduling the first PDSCH is A and the HARQ process ID of the second PDSCH in the PDCCH for scheduling the second PDSCH is B, in the HARQ-ACK codebook, the HARQ-ACK bit of the PDSCH with a smaller value among A and B values may be disposed before the HARQ-ACK bit of the PDSCH with a larger value.

That is, the position of the HARQ-ACK bit may be determined according to the ascending order of the HARQ process IDs. Here, the UE may assume that HARQ process IDs of HARQ-ACKs transmitted with one HARQ-ACK codebook have values different from each other. Therefore, it is not expected that one HARQ-ACK codebook having the HARQ-ACK bit of the PDSCH having the same HARQ process ID is generated.

For example, when the number of bits of the counter-DAI field included in at least one of the PDCCH for scheduling the first PDSCH and the PDCCH for scheduling the second PDSCH is different or omitted, or the size is set to 0 bits, the UE may generate the HARQ-ACK codebook based on the HARQ-ACK process ID included in the PDCCH for scheduling each PDSCH and transmit it to the base station through UCI.

Figure 22:
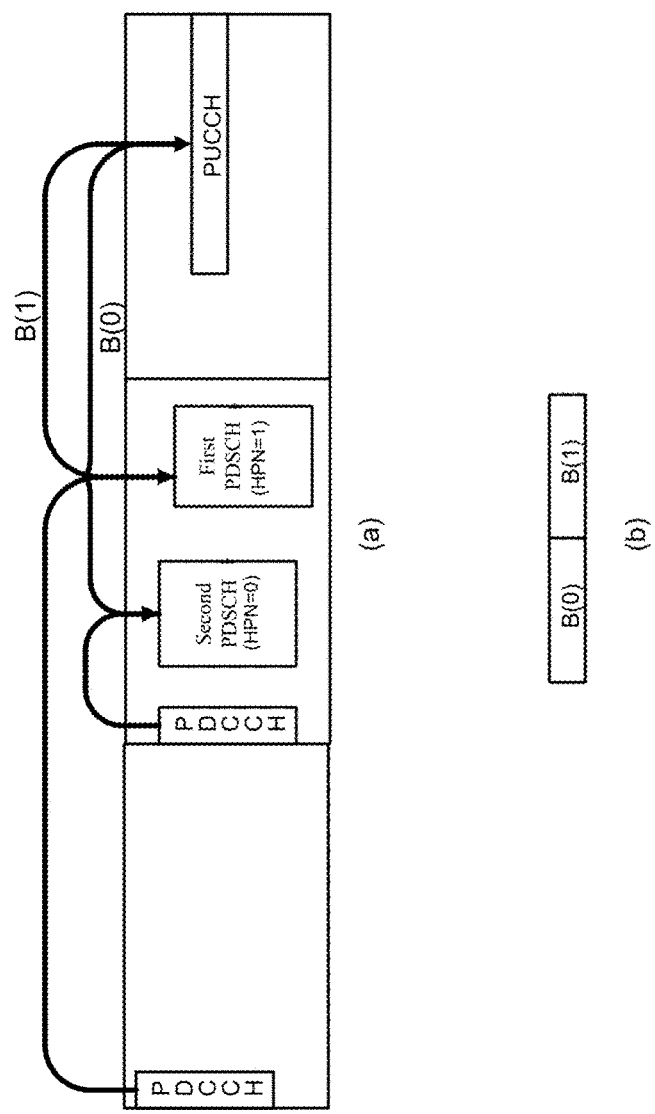
FIG. 22 illustrates transmission of a HARQ-ACK for a PDSCH according to a HARQ process ID (or HARQ process number) of a PDCCH for scheduling the PDSCH according to an embodiment of the present disclosure.

In this case, as illustrated in (a) of FIG. 22, the value of the HARQ-ACK process ID or HARQ-ACK process number of the PDCCH for scheduling the second PDSCH may be '0', and the value of the HARQ-ACK process ID or HARQ-ACK process number of the PDCCH for scheduling the first PDSCH may be '1'. In this case, as illustrated in (b) of FIG. 15, based on the ascending order of the HARQ-ACK process IDs or HARQ-ACK process numbers, B(0), which is the HARQ-ACK bit for the second PDSCH with a lower HARQ-ACK process ID or HARQ-ACK process number, may be positioned before B(1), which is the HARQ-ACK bit for the first PDSCH.

In a fourth embodiment of the present disclosure, the UE may determine the order of the HARQ-ACK bits of the PDSCH in the HARQ-ACK codebook by using cell information on the received PDCCH for scheduling each PDSCH. Cell information may mean an index (or ID) of a cell. The UE may be configured to monitor PDCCHs in a plurality of cells. In this case, the UE may receive different PDCCHs in different cells. The UE may arrange HARQ-ACK bits of PDSCHs received in different cells in the HARQ-ACK codebook according to the ascending order of the indexes of the cells that have received the PDCCHs for scheduling the PDSCHs.

In a fifth embodiment of the present disclosure, the UE may determine the order of the HARQ-ACK bits of the PDSCH by using information about the CORESET (or search space) that has received the PDCCH for scheduling the PDSCH to generate the HARQ-ACK codebook. Here, the information about CORESET (or search space) may be an index (or ID) of CORESET (or search space).

The UE may be configured to monitor the PDCCH in a plurality of CORESETs (or search spaces). In this case, the UE may receive different PDCCHs in different CORESETs (or search spaces). In this case, the UE may arrange the order of HARQ-ACK bits of PDSCHs received in different CORESETs (or search spaces) according to the ascending order of the indexes of the CORESETs (or search spaces) that have received the PDCCHs for scheduling the PDSCHs to generate the HARQ-ACK codebook.

In a sixth embodiment of the present disclosure, the UE may determine the order of the HARQ-ACK bits of the PDSCH in the HARQ-ACK codebook by using frequency domain information about the PDCCH for scheduling the PDSCH. Here, the frequency domain information may be the lowest PRB index among the PRBs to which the PDCCH is allocated. Here, index means common PRB index, and this index indicates how far away from Point A in the frequency domain. Point A means the reference frequency of the UE in an initial access process, and specifically, Point A is as follows.

offsetToPointA indicates a frequency offset between Point A and the lowest subcarrier of the lowest resource block. The lowest resource block has a subcarrier spacing provided by the higher layer parameter subCarrierSpacingCommon and overlaps with the SS/PBCH block used by the UE for initial cell selection. offsetToPointA is expressed in units of resource blocks assuming a 15 kHz subcarrier spacing for FR1 and a 60 kHz subcarrier spacing for FR2.

absoluteFrequencyPointA indicating the frequency position of Point A is expressed as an absolute radio frequency channel number (ARFCN) for all other cases.

The UE may be configured to monitor a plurality of PDCCHs, and may receive different PDCCHs in different frequency domains. In this case, the UE may arrange HARQ-ACK bits of PDSCHs received in different frequency domains in the HARQ-ACK codebook according to the ascending order of the lowest PRB indexes of the PDCCHs for scheduling the PDSCHs. In this method, when a plurality of PDCCHs are received by the UE in one CORESET (or search space) in the fifth embodiment, the order of HARQ-ACK bits in the HARQ-ACK codebook may be determined.

The first to sixth embodiments may be used in combination with each other, through which the UE may determine the order of HARQ-ACK bits for respective PDSCHs in the HARQ-ACK codebook. For example, the first embodiment and the third embodiment may be combined. With this combination, the order of the HARQ-ACK bits in the HARQ-ACK codebook may be first determined according to the time domain information about the PDCCH, and when the order may not be determined by the time domain information, the order may be determined according to the HARQ process ID according to the third embodiment. Alternatively, the first, fourth, fifth, and sixth embodiments may be combined. With this combination, the order of the HARQ-ACK bits in the HARQ-ACK codebook may be first determined according to the time domain information about the PDCCH. Then, when the order may not be determined by the time domain information according to each embodiment, the order is determined according to the cell information, and when the order may not be determined by the cell information, the order may be determined according to the information about the CORESET (or search space). In addition, when the order may not be determined with the information about the CORESET (or search space), the order may be determined according to the frequency domain allocation information about the PDCCH.

In addition, in another embodiment of the present disclosure, when PDSCHs are each scheduled through a plurality of PDCCHs and the number of bits of the counter-DAI fields included in the plurality of PDCCHs are different from each other, the UE may individually generate each of the HARQ-ACK codebooks according to the number of bits of the counter-DAI without multiplexing according to the number of bits.

For example, when the number of bits of the counter-DAI field is 2 bits or 1 bit, the UE may individually generate each of the HARQ-ACK codebook for PDSCHs scheduled by the PDCCH including a counter-DAI with a bit number of 2 bits, and/or the HARQ-ACK codebook for PDSCHs scheduled by the PDCCH including the counter-DAI with a bit number of 1 bit and transmit them to the base station.

That is, for the UE, one HARQ-ACK codebook may include only HARQ-ACKs of PDSCHs scheduled with DCI formats with the same number of bits of the counter-DAI.

Through the first to sixth embodiments described above, the UE may determine the position of the bits of the HARQ-ACK in the HARQ-ACK codebook without the counter-DAI field. However, in generating a HARQ-ACK codebook including HARQ-ACK bits for each PDSCH, a problem may occur when the UE determines the size of the HARQ-ACK codebook.

For example, when the UE does not receive one of the PDCCHs, the UE may determine the size of the HARQ-ACK codebook differently due to the PDCCH that has not been received, and thus a method for solving this is required.

In this case, the UE may always assume that the remainder is Y when the size of the dynamic HARQ-ACK codebook is divided by X. It is desirable that X=4 and Y=1. That is, the size of the dynamic HARQ-ACK codebook may be determined as one of 1, 5, 9, bits. When the UE receives the PDCCH for scheduling Z PDSCHs, the UE may determine the smallest value among sizes greater than or equal to Z as the size of the HARQ-ACK codebook. For example, if Z=3, 5 may be determined as the size of the HARQ-ACK codebook.

The counter-DAI field may or may not be included in the DCI of the PDCCH corresponding to the HARQ-ACK of one HARQ-ACK codebook. In this case, in the HARQ-ACK codebook, the UE determines the positions of the HARQ-ACK of the PDSCH scheduled by the DCI including the counter-DAI field and the HARQ-ACK of the PDSCH scheduled by the DCI without the counter-DAI field.

In an embodiment of the present disclosure, in this case, the UE may individually generate each of the HARQ-ACK codebooks according to whether the DCI includes the counter-DAI field.

Specifically, the UE generates a first sub-HARQ-ACK codebook by collecting only HARQ-ACKs of PDSCHs scheduled by DCI including the counter-DAI field. In this case, the position of the HARQ-ACK in the first sub-HARQ-ACK codebook is determined by using the value of the counter-DAI field (that is, the position is determined according to the ascending order of the counter-DAIs). In this case, when the numbers of bits of the counter-DAI fields are different from each other, the method of first to sixth embodiments described above and a combination thereof may be used.

In addition, the UE generates a second sub-HARQ-ACK codebook by collecting only HARQ-ACKs of PDSCHs scheduled by DCI, in which the counter-DAI field is omitted or is set to a 0-bit value. In this case, the position of the HARQ-ACK in the second sub-HARQ-ACK codebook may be determined according to the first to sixth embodiments described above and a combination thereof. The UE continuously may combine the first sub-HARQ-ACK codebook and the second sub-HARQ-ACK codebook (that is, such that the first bit of the second sub-HARQ-ACK codebook comes after the last bit of the first sub-HARQ-ACK codebook) to generate a HARQ-ACK codebook. In this method, the UE needs to generate two sub-HARQ-ACK codebooks in different ways, and UE complexity may increase, accordingly.

In another embodiment of the present disclosure, in the above situation, the UE may ignore the counter-DAI field included in the DCI. That is, by considering all DCI as DCI without the counter-DAI field, the positions of the HARQ-ACK bits in the HARQ-ACK codebook may be determined by using the first to sixth embodiments and a combination thereof.

In another embodiment of the present disclosure, a UE configured with a semi-static HARQ-ACK codebook may determine HARQ-ACK bits for one PDSCH.

Specifically, the UE configured with the semi-static HARQ-ACK codebook needs to transmit the HARQ-ACK codebook including a predetermined number of HARQ-ACK bits to the PUCCH. In this case, the predetermined number may be determined regardless of which PDSCH is actually scheduled by the UE, and may be derived from information set as a higher layer.

The information set as the higher layer may include at least CBG configuration information of a cell, and the UE may receive CBG configuration information for each cell. The CGB configuration information may be used to configure the maximum number of CBGs that one PDSCH (or TB) may include, and may be expressed as $N_{MAX}$. In the semi-static HARQ-ACK codebook, when HARQ-ACK bits of PDSCHs are included, it needs to be determined how many bits of HARQ-ACK one PDSCH corresponds to. In general, when CBG transmission is not configured, the PDSCH may correspond to 1-bit HARQ-ACK (2 bits when 2 TB transmission is configured), and when CBG transmission is configured, the PDSCH may correspond to $N_{MAX}$ bits HARQ-ACK.

When the semi-static HARQ-ACK is configured for the UE, the number of HARQ-ACK bits determined above needs to be included in the PUCCH. Even if CBG-based transmission is configured, in a specific situation, the UE may transmit only 1-bit HARQ-ACK for the PDSCH by including it in the PUCCH.

For example, when CBG-based transmission is configured, one downlink cell (or carrier) is configured in the UE while satisfying at least one of the following cases, and when there is one monitoring occasion for receiving the PDCCH, the UE may generate only 1 bit of HARQ-ACK of the SPS PDSCH or SPS PDSCH release DCI or PDSCH.

When the UE needs to transmit HARQ-ACK for one SPS PDSCH

When one SPS PDSCH release DCI is received

When HARQ-ACK of PDSCH scheduled in DCI format 1_0 or DCI format 1_2 is transmitted That is, even if CBG-based transmission is configured, the UE may generate only HARQ-ACK of 1 bit per PDSCH.

In contrast, when CBG-based transmission is configured, and when at least one of the following conditions is satisfied, and two or more downlink cells (or carriers) are configured in the UE or there are two or more monitoring occasions for receiving the PDCCH, the UE may generate $N_{MAX}$ bits by repeating 1 bit of HARQ-ACK (TB-level HARQ-ACK) of SPS PDSCH or SPS PDSCH release DCI or PDSCH $N_{MAX}$ times.

When HARQ-ACK for one SPS PDSCH is transmitted

When one SPS PDSCH release DCI is received

When HARQ-ACK of PDSCH scheduled in DCI format 1_0 or DCI format 1_2 is transmitted That is, in accordance with CBG-based transmission, the UE may generate only HARQ-ACK of $N_{MAX}$ bits per PDSCH.

In the above operation, DCI format 1_2 is a DCI format that may set the size of each field for high reliability and low latency. This DCI format 1_2 does not support CBG-based operation. That is, the PDSCH scheduled in DCI format 1_2 always corresponds to 1 bit of TB-level HARQ-ACK. This is similar to DCI format 1_0. Therefore, DCI format 12 may be handled in the same way as DCI format 1_0.

Figure 23:
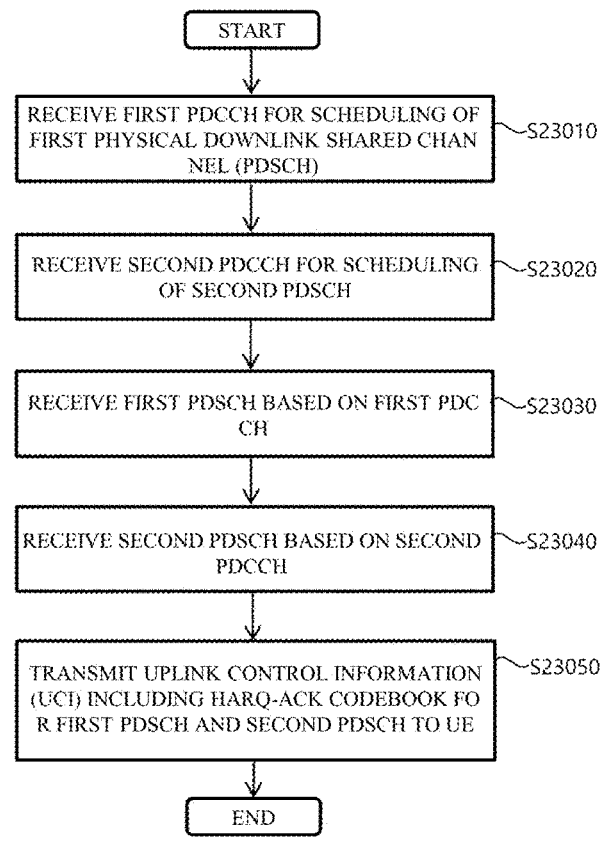
FIG. 23 is a flowchart illustrating an example of an operation of a UE for transmitting a HARQ-ACK based on downlink information having a different format according to an embodiment of the present disclosure.

FIG. 23 is a flowchart illustrating an example of an operation of a UE for transmitting a HARQ-ACK based on downlink information having a different format according to an embodiment of the present disclosure.

Referring to FIG. 23, the UE may generate a HARQ-ACK codebook including HARQ-ACK bits for a plurality of PDSCHs scheduled by DCI on a plurality of PDCCHs transmitted from the base station. In this case, when the format of the DCI is different and the number of bits of the DAI field included in each piece of DCI is different, the UE may interpret the value of the DAI field under a certain condition to generate the HARQ-ACK codebook.

First, the UE receives a first PDCCH for scheduling of a first downlink physical shared channel (PDSCH) (S23010). In this case, the UE may receive setting information including information for receiving the PDCCH before receiving the first PDCCH.

The first PDCCH may include a first counter downlink assignment indicator (DAI) indicating the number of PDSCHs scheduled until a time point at which the first PDCCH is monitored, and a first total DAI indicating the number of all PDSCHs scheduled in a serving cell.

Then, the UE receives a second PDCCH for scheduling of a second PDSCH including a second counter DAI and a second total DAI (S23020).

Then, the UE receives the first PDSCH based on the first PDCCH (S23030) and receives the second PDSCH based on the second PDCCH (S23040).

After receiving the first PDSCH and the second PDSCH, the UE generates HARQ-ACK bits for each of the first and second PDSCHs, and generates the HARQ-ACK codebook by using the generated HARQ-ACK bits.

Then, the UE transmits uplink control information (UCI) including the HARQ-ACK codebook to the base station (S23050).

The value of the second counter DAI may be recognized based on the number of bits of the first counter DAI when the number of bits of the first counter DAI is different from the number of bits of the second counter DAI. That is, when the number of bits of the first counter DAI is different from the number of bits of the second counter DAI, the UE may generate a HARQ-ACK codebook including HARQ-ACK bits through the methods of Proposals 1 to 3 described above.

For example, when the number of the bits of the first counter DAI is smaller than the number of the bits of the second counter DAI, a value indicated by the second counter DAI may be recognized based on at least one of bits with a number equal to the number of bits of the first counter DAI among bits of the second counter DAI.

Alternatively, when the number of bits of the first counter DAI is greater than the number of bits of the second counter DAI, the value indicated by the second counter DAI may be interpreted by extending the number of bits of the second counter DAI to the same number of bits as the number of bits of the first counter DAI.

In this case, when there are a plurality of candidate values of the second counter DAI, the value of the second counter DAI may be interpreted as a value with the smallest difference from a value indicated by the first counter DAI among the plurality of candidate values.

Figure 24:
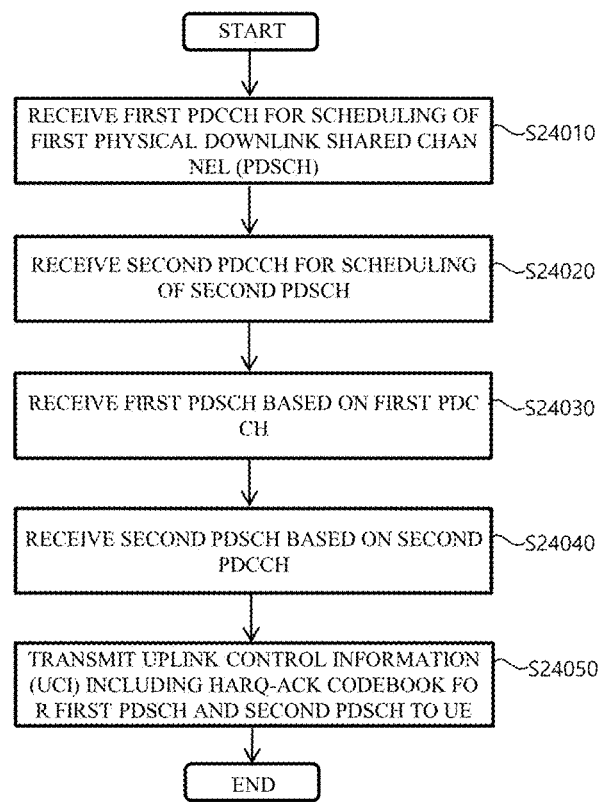
FIG. 24 is a flowchart illustrating an example of an operation of a base station for receiving a HARQ-ACK based on downlink information having a different format according to an embodiment of the present disclosure.

FIG. 24 is a flowchart illustrating an example of an operation of a base station for receiving a HARQ-ACK based on downlink information having a different format according to an embodiment of the present disclosure.

Referring to FIG. 24, the base station may schedule the PDSCH to the UE through a plurality of PDCCHs having a different format. In this case, when the number of bits of the DAI field included in DCI of a different format on the PDCCH is different, the base station may receive a HARQ-ACK codebook for PDSCHs scheduled by DCI of the different format from the UE.

First, the base station transmits a first PDCCH for scheduling of a first downlink physical shared channel (PDSCH) to the UE (S24010). In this case, the base station may transmit setting information including information for receiving the PDCCH before transmitting the first PDCCH.

The first PDCCH may include a first counter downlink assignment indicator (DAI) indicating the number of PDSCHs scheduled until a time point at which the first PDCCH is monitored, and a first total DAI indicating the number of all PDSCHs scheduled in a serving cell.

Then, the base station transmits a second PDCCH for scheduling of a second PDSCH including a second counter DAI and a second total DAI (S24020).

Then, the base station transmits the first PDSCH based on the first PDCCH (S24030) and transmits the second PDSCH based on the second PDCCH (S24040).

The base station receives a HARQ-ACK codebook including HARQ-ACK bits for each of the first PDSCH and the second PDSCH generated by the UE through uplink control information (UCI) from the UE (S24050).

The value of the second counter DAI may be recognized based on the number of bits of the first counter DAI when the number of bits of the first counter DAI is different from the number of bits of the second counter DAI. That is, when the number of bits of the first counter DAI is different from the number of bits of the second counter DAI, the UE may generate a HARQ-ACK codebook including HARQ-ACK bits through the methods of Proposals 1 to 3 described above.

For example, when the number of the bits of the first counter DAI is smaller than the number of the bits of the second counter DAI, a value indicated by the second counter DAI may be recognized based on at least one of bits with a number equal to the number of bits of the first counter DAI among bits of the second counter DAI.

Alternatively, when the number of bits of the first counter DAI is greater than the number of bits of the second counter DAI, the value indicated by the second counter DAI may be interpreted by extending the number of bits of the second counter DAI to the same number of bits as the number of bits of the first counter DAI.

In this case, when there are a plurality of candidate values of the second counter DAI, the second counter DAI value may be interpreted as a value with the smallest difference from a value indicated by the first counter DAI among the plurality of candidate values.

The above description of the present disclosure is for illustration, and those of ordinary skill in the art to which the present disclosure pertains could understand that it may be easily modified into other specific forms without changing the technical spirit or essential features of the present disclosure. Therefore, it is to be appreciated that the embodiments described above are intended to be illustrative in all respects and not restrictive. For example, each component described as a single type may be implemented in a distributed manner, and similarly, components described to be distributed may also be implemented in a combined form.

The scope of the present disclosure is represented by the claims to be described below rather than the above detailed description, and it is to be interpreted that the meaning and scope of the claims and all changes or modifications derived from the equivalents thereof come within the scope of the present disclosure.

What is claimed is:

1. A user equipment for use in a wireless communication system, the user equipment comprising:
   a communication module; and
   a processor for controlling the communication module,
   wherein the processor is configured to,
   receive a plurality of first downlink control information (DCI) formats for downlink scheduling, wherein each first DCI format includes an Nc-bit counter downlink assignment index (c-DAI), and Nc is 1;
   receive a second DCI format for scheduling a physical uplink shared channel (PUSCH), wherein the second DCI format includes 2-bit uplink DAI (UL-DAI);
   determine hybrid automatic repeat request (HARQ)-acknowledge (ACK) bits for the downlink scheduling, a number of the HARQ-ACK bits being based on:

a value corresponding to floor(j *C/4), where
    j is a counter number for a case that an $m^{th}$ Nc-bit c-DAI has a value of less than or equal to an $(m-1)^{th}$ Nc-bit c-DAI within the plurality of received Nc-bit c-DAIs where m is a positive integer, C is $2^{\wedge}Nc$, and floor is a flooring function; and transmit control information including the HARQ-ACK bits via the PUSCH.

2. The user equipment of claim 1, wherein the number of the HARQ-ACK bits is based on: a value O corresponding to 4*(floor(j*C/4)+Q)+V, where
    Q is 0 or 1, and
    V is a value of the 2-bit UL-DAI, and in a range of 1 to 4.

3. The user equipment of claim 2, wherein the number of the HARQ-ACK bits is determined as one of O and 2*O.

4. The user equipment of claim 2, wherein Q is 1 only when V is less than $V_{temp}$, and
    wherein $V_{temp}$ is determined as a 2-bit c-DAI value converted from a value of a last one of the plurality of received Nc-bit c-DAIS, so that the converted 2-bit c-DAI value corresponds to a number of the downlink scheduling determined based on the plurality of received Nc-bit c-DAIS.

5. The user equipment of claim 4, wherein a value of the last one of the plurality of received Nc-bit c-DAIS, and the converted 2-bit c-DAI value satisfy a relation including the following table:

| j | 0 | 0 | 1 | 1 | 2 | 2 | 3 | ... |
|---|---|---|---|---|---|---|---|-----|
| X | 1 | 2 | 1 | 2 | 1 | 2 | 1 | ... |
| Y | 1 | 2 | 3 | 4 | 1 | 2 | 3 | ... | where X represents the value of the last one of the plurality of received Nc-bit c-DAIS, and Y represents the converted 2-bit c-DAI value.

6. The user equipment of claim 1, wherein the Nc-bit c-DAI is associated with a bit position of a corresponding HARQ-ACK bit in the HARQ-ACK bits.

7. The user equipment of claim 1, wherein the wireless communication system includes 3rd generation partnership project (3GPP)-based wireless communication system.

8. The user equipment of claim 1, wherein the Nc-bit c-DAI is related to a counter number of a corresponding downlink scheduling, and the 2-bit UL DAI is related to a number of the downlink scheduling.

9. A method performed by a user equipment in a wireless communication system, the method comprising:
    receiving a plurality of first downlink control information (DCI) format for downlink scheduling, wherein each first DCI format includes an Nc-bit counter downlink assignment index (c-DAI), and Nc is 1;
    receiving a second DCI format for scheduling a physical uplink shared channel (PUSCH), wherein the second DCI format includes 2-bit uplink DAI (UL-DAI);
    determining hybrid automatic repeat request (HARQ)-acknowledge (ACK) bits for the downlink scheduling, a number of the HARQ-ACK bits being based on:
    a value corresponding to floor(j *C/4), where
        j is a counter number for a case that an $m^{th}$ Nc-bit c-DAI has a value of less than or equal to an $(m-1)^{th}$ Nc-bit c-DAI within the plurality of received Nc-bit c-DAIs where m is a positive integer, C is $2^{\wedge}Nc$, and floor is a flooring function; and
    transmitting control information including the HARQ-ACK bits via the PUSCH.

10. The method of claim 9, wherein the number of the HARQ-ACK bits is based on: a value O corresponding to 4*(floor(j*C/4)+Q)+V, where
    Q is 0 or 1, and
    V is a value of the 2-bit UL-DAI, and in a range of 1 to 4.

11. The method of claim 10, wherein the number of the HARQ-ACK bits is determined as one of O and 2*O.

12. The method of claim 10, wherein Q is 1 only when V is less than $V_{temp}$, and
    wherein $V_{temp}$ is determined as a 2-bit c-DAI value converted from a value of a last one of the plurality of received Nc-bit c-DAIs, so that the converted 2-bit c-DAI value corresponds to a number of the downlink scheduling determined based on the plurality of received Nc-bit c-DAIs.

13. The method of claim 12, wherein a value of the last one of the plurality of received Nc-bit c-DAIs, and the converted 2-bit c-DAI value satisfy a relation including the following table:

| j | 0 | 0 | 1 | 1 | 2 | 2 | 3 | ... |
|---|---|---|---|---|---|---|---|-----|
| X | 1 | 2 | 1 | 2 | 1 | 2 | 1 | ... |
| Y | 1 | 2 | 3 | 4 | 1 | 2 | 3 | ... | where X represents the value of the last one of the plurality of received Nc-bit c-DAIs, and Y represents the converted 2-bit c-DAI value.

14. The method of claim 9, wherein the Nc-bit c-DAI is associated with a bit position of a corresponding HARQ-ACK bit in the HARQ-ACK bits.

15. The method of claim 9, wherein the wireless communication system includes 3rd generation partnership project (3GPP)-based wireless communication system.

16. The method of claim 9, wherein the Nc-bit c-DAI is related to a counter number of a corresponding downlink scheduling, and the 2-bit UL DAI is related to a number of the downlink scheduling.

* * * * *